US011098815B2

(12) United States Patent
Yokoe

(10) Patent No.: US 11,098,815 B2
(45) Date of Patent: *Aug. 24, 2021

(54) VALVE DRIVE DEVICE

(71) Applicant: NIDEC SANKYO CORPORATION, Nagano (JP)

(72) Inventor: Satoru Yokoe, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 188 days.

This patent is subject to a terminal disclaimer.

(21) Appl. No.: 16/425,068

(22) Filed: May 29, 2019

(65) Prior Publication Data
US 2019/0368628 A1 Dec. 5, 2019

(30) Foreign Application Priority Data

May 31, 2018 (JP) .............................. JP2018-104994

(51) Int. Cl.
*F16K 31/04* (2006.01)
(52) U.S. Cl.
CPC ................................. *F16K 31/043* (2013.01)
(58) Field of Classification Search
CPC .. F16K 31/043; F16K 31/047; F16K 31/0675; F16K 31/53; F16K 31/535; F16K 31/041; F25B 41/30
See application file for complete search history.

(56) References Cited

U.S. PATENT DOCUMENTS

| 6,880,802 B2* | 4/2005 | Hara | F16K 3/08 |
| | | | 137/315.17 |
| 6,926,250 B1* | 8/2005 | Hashimoto | F16K 11/074 |
| | | | 251/129.11 |
| 7,437,888 B2* | 10/2008 | Son | F25B 41/20 |
| | | | 62/527 |
| 7,793,915 B2* | 9/2010 | Ozawa | F16K 11/074 |
| | | | 251/248 |
| 10,781,932 B2* | 9/2020 | Yokoe | F16K 31/043 |
| 2015/0276070 A1 | 10/2015 | Yokoe et al. | |
| 2019/0162314 A1 | 5/2019 | Yokoe | |

FOREIGN PATENT DOCUMENTS

| CN | 107940080 A | 4/2018 |
| JP | 2001208096 A | 8/2001 |
| JP | 5615993 B1 | 10/2014 |
| JP | 20170219064 A | 12/2017 |
| JP | 6278684 B2 | 2/2018 |

* cited by examiner

*Primary Examiner* — Eric Keasel
(74) *Attorney, Agent, or Firm* — Cantor Colburn LLP

(57) ABSTRACT

There is provided a valve drive device including: a base including a fluid inlet, a fluid outlet, and a valve seat surface, at least one of the fluid inlet and the fluid outlet being opened at the valve seat surface; a cover configured to define a valve chamber; a valve element configured to open and close any one of the fluid inlet and the fluid outlet in the valve chamber; and a valve element driver configured to drive and rotate the valve element. The valve element driver includes: a motor; a drive gear configured to rotate together with a rotor of the motor; a driven gear configured to rotate, in a state of meshing with the drive gear, the valve element by rotation of the drive gear; and a power transmission switching unit.

12 Claims, 28 Drawing Sheets

VALVE DRIVE DEVICE

CROSS-REFERENCE TO RELATED APPLICATION

The present application claims priority under 35 U.S.C. § 119 to Japanese Patent Application No. 2018-104994, filed on May 31, 2018, the entire contents of which are incorporated herein by reference.

FIELD OF THE INVENTION

At least an embodiment of the present invention relates to a valve drive device for driving a valve that regulates a fluid flow rate.

BACKGROUND

Conventionally, there is a refrigerant valve device that supplies a refrigerant to cool the inside of a refrigerator or the like. Some of such refrigerant valve devices include a valve drive device for driving a valve to adjust the supply amount of the refrigerant that is supplied to the inside of the refrigerator (Japanese Patent No. 5615993).

The refrigerant valve device described in Japanese Patent No. 5615993 includes: on a base provided with a refrigerant inlet, a refrigerant outlet, and a valve seat surface, a valve element that is rotatable about a position close to either the refrigerant inlet or the refrigerant outlet; and a valve element drive mechanism for rotating the valve element. The valve element drive mechanism includes a stepping motor (hereinafter referred to as a motor), a pinion that rotates integrally with the drive shaft of the motor, and an output gear that meshes with the pinion and rotates integrally with the valve element.

When the motor rotates, the valve element as well as the output gear rotates through the pinion rotating integrally with the motor. Thus, the valve element can adjust the degree of the opening of either the refrigerant inlet or the refrigerant outlet and can regulate the supply amount of the refrigerant.

Incidentally, in this valve element drive mechanism, by rotating the pinion in a forward rotation direction, the output gear and the valve element can be rotated from a first rotation-restricted position to a second rotation-restricted position that is a position obtained by rotating the motor in the forward rotation direction.

Further, in the first rotation-restricted position, an arm unit of the output gear is configured to abut on an abutted unit of the pinion, and the rotation by driving the motor in a reverse rotation direction is restricted.

Here, if the motor is rotated in the reverse rotation direction to rotate the motor from the second rotation-restricted position to the first rotation-restricted position, to adjust the supply amount of the refrigerant, the arm unit of the output gear abuts on the abutted unit of the pinion, and the rotation of the pinion in the reverse rotation direction is restricted. As a result, the motor tries to continue the rotation in the reverse rotation direction in a state where the rotation of the pinion in the reverse rotation direction is restricted, and thus, a step-out occurs in the motor. As a result, during the step-out of the motor, there is a possibility that the arm unit and the abutted unit collide with each other and generate noise (collision noise).

In addition, in the valve element drive mechanism, in a state where the arm unit of the output gear and the abutted unit of the pinion abut against each other, the rotation of the pinion is continued and positioning of an origin position of the pinion with respect to the output gear in the first rotation-restricted position is performed. As a result, after the arm unit of the output gear and the abutted unit of the pinion abut against each other, until the step-out occurs in the motor, or even after the step-out has occurred in the motor, the pinion rotates excessively until being positioned at the origin position, and vibration and noise are generated between the arm unit of the output gear and the abutted unit of the pinion.

At least an embodiment of the present invention has been made in view of the above problems, and an object thereof is to provide a valve drive device capable of reducing noise.

SUMMARY

According to one aspect of the present disclosure, there is provided a valve drive device including: a base including a fluid inlet, a fluid outlet, and a valve seat surface, at least one of the fluid inlet and the fluid outlet being opened at the valve seat surface; a cover configured to define a valve chamber such that the fluid inlet and the fluid outlet communicate with each other between the valve seat surface and the cover; a valve element configured to open and close any one of the fluid inlet and the fluid outlet in the valve chamber and having a contact surface sliding on the valve seat surface; and a valve element driver configured to drive and rotate the valve element. The valve element driver includes: a motor; a drive gear configured to rotate together with a rotor of the motor; a driven gear configured to rotate, in a state of meshing with the drive gear, the valve element by rotating the drive gear; and a power transmission switching unit capable of switching between a power transmission state where the drive gear meshes with the driven gear to transmit power of the motor to the driven gear and a power non-transmission state where the meshing state between the drive gear and the driven gear is released.

According to this aspect, the valve element driver includes: a motor; a drive gear configured to rotate integrally with a rotor of the motor; a driven gear configured to rotate, in a state of meshing with the drive gear, the valve element by rotating the drive gear; and a power transmission switching unit capable of switching between a power transmission state where the drive gear meshes with the driven gear to transmit power of the motor to the driven gear and a power non-transmission state where the meshing state between the drive gear and the driven gear is released, and thus, the meshing state between the drive gear and the driven gear is released by the power transmission switching unit by switching from the power transmission state to the power non-transmission state. As a result, it is possible to reduce the possibility of a step-out occurring in the motor, and to suppress noise caused by the step-out or noise generated by rotating the drive gear excessively to determine an origin position of the drive gear.

In the valve drive device according to at least an embodiment of the present invention, the driven gear includes a meshing unit in which teeth are formed along a circumferential direction of the driven gear, and a non-meshing unit in which no teeth are formed in the circumferential direction.

According to this aspect, the above-described operation and effect can be obtained.

In the valve drive device according to at least an embodiment of the present invention, the meshing unit is continuously formed along the circumferential direction, and when switching from the power transmission state to the power non-transmission state is performed, meshing of the drive gear and the driven gear is released.

According to this aspect, the meshing unit is continuously formed along the circumferential direction, and when switching from the power transmission state to the power non-transmission state is performed, meshing of the drive gear and the driven gear is released, thus, the drive gear is located at the non-meshing unit in which no teeth are formed in the power non-transmission state and the drive gear does not contact the driven gear even when the drive gear as well as the motor continue to rotate, and therefore, the collision between the drive gear and the driven gear can be prevented and the generation of a collision noise can be prevented.

In the valve drive device according to at least an embodiment of the present invention, the power transmission switching unit includes one or more convex units formed on the drive gear and protruding toward a radial direction of the drive gear; and a rotation restriction unit provided on the non-meshing unit of the driven gear and configured to engage with the one or more convex units, and when the rotation restriction unit engages with the one or more convex units of the drive gear rotated in a first direction in the power non-transmission state, the rotation restriction unit meshes the drive gear and the driven gear to switch from the power non-transmission state to the power transmission state, and when the drive gear rotates in a second direction opposite to the first direction, the rotation restriction unit maintains the power non-transmission state without meshing the drive gear and the driven gear.

According to this aspect, the power transmission switching unit includes one or more convex units formed on the drive gear and protruding toward a radial direction of the drive gear; and a rotation restriction unit provided on the non-meshing unit of the driven gear and configured to engage with the one or more convex units, and when the rotation restriction unit engages with the one or more convex units of the drive gear rotated in a first direction in the power non-transmission state, the rotation restriction unit meshes the drive gear and the driven gear to switch from the power non-transmission state to the power transmission state, and when the drive gear rotates in a second direction opposite to the first direction, the rotation restriction unit maintains the power non-transmission state without meshing the drive gear and the driven gear, and thus, power can be appropriately transmitted and disconnected from the motor to the driven gear and drive of the valve element can be ensured.

In the valve drive device according to at least an embodiment of the present invention, the rotation restriction unit is configured as a clutch mechanism configured to allow rotation of the driven gear when the drive gear rotates in the first direction and to restrict rotation of the driven gear when the drive gear rotates in the second direction.

According to this aspect, the rotation restriction unit is configured as a clutch mechanism configured to allow rotation of the driven gear when the drive gear rotates in the first direction and to restrict rotation of the driven gear when the drive gear rotates in the second direction, and thus, the rotation restriction unit can be configured by a known clutch mechanism or the like, for example, and the design time can be shortened and the cost can be reduced.

In the valve drive device according to at least an embodiment of the present invention, the rotation restriction unit is a lever member that is pivotably attached to the driven gear with respect to the driven gear and urged outward in a radial direction of the driven gear, and includes a first contact unit configured to contact the one or more convex units when the drive gear rotates in the first direction and a second contact unit configured to contact the one or more convex units when the drive gear rotates in the second direction, wherein when a convex unit among the one or more convex units contacts the first contact unit, the rotation restriction unit is pressed by the convex unit to rotate the driven gear, teeth of the drive gear and teeth of the driven gear mesh with each other, and the power transmission state is obtained, and wherein when a convex unit among the one or more convex units contacts the second contact unit, the rotation restriction unit pivots inward in the radial direction against an urging force urging the rotation restriction unit, the drive gear rotates idly without the teeth of the drive gear meshing with the teeth of the driven gear, and the power non-transmission state is maintained.

According to this aspect, the rotation restriction unit that is configured as a lever member includes the first contact unit and the second contact unit and when a convex unit among the one or more convex units contacts the first contact unit, the rotation restriction unit is pressed by the convex unit to rotate the driven gear, teeth of the drive gear and teeth of the driven gear mesh with each other, and the power transmission state is obtained, and when a convex unit among the one or more convex units contacts the second contact unit, the rotation restriction unit pivots inward in the radial direction against an urging force urging the rotation restriction unit, the drive gear rotates idly without the teeth of the drive gear and the teeth of the driven gear meshing with each other, and the power non-transmission state is maintained, and thus, power can be transmitted or disconnected from the motor to the driven gear solely by switching a portion to be contacted by the convex unit in accordance with a rotation direction of the drive gear. Therefore, the rotation restriction unit may have a simple configuration.

In the valve drive device according to at least an embodiment of the present invention, the driven gear includes a co-rotation prevention unit configured to restrict the second contact unit from being pressed by the convex unit in a rotation direction of the one or more convex units and the driven gear from rotating in a rotation direction in accordance with a rotation direction of the drive gear, when the convex unit contacts the second contact unit and the rotation restriction unit pivots inward in the radial direction against the urging force urging the rotation restriction unit.

According to this aspect, co-rotation of the driven gear due to the drive gear can be restricted by the co-rotation prevention unit, and thus, a state of idle rotation of the drive gear can be maintained and the power non-transmission state can be surely maintained.

The valve drive device according to at least an embodiment of the present invention includes an urging member configured to urge the rotation restriction unit outward in the radial direction of the driven gear.

According to this aspect, the effect described above can be obtained with a simple structure.

In the valve drive device according to at least an embodiment of the present invention, the urging member is a torsion spring held by a shaft of the driven gear, the driven gear is provided with a holding unit configured to hold one end of the torsion spring, and the other end of the torsion spring urges the rotation restriction unit.

According to this aspect, the urging member is a torsion spring held by a shaft of the driven gear, the driven gear is provided with a holding unit configured to hold one end of the torsion spring, the other end of the torsion spring urges the rotation restriction unit, and thus, the holding configuration of the urging member in the driven gear can be simplified.

In the valve drive device according to at least an embodiment of the present invention, the drive gear is provided with a lock avoidance tooth at a position corresponding to the one or more convex units in the circumferential direction, and an addendum circle diameter of the lock avoidance tooth is smaller than an addendum circle diameter of a tooth other than the lock avoidance tooth.

Here, for example, the drive gear and the driven gear may be a locked state where the tips of the respective teeth contact each other due to their phase relationship so that they do not mesh. According to this aspect, the drive gear is provided with lock avoidance teeth at positions corresponding to the convex units in the circumferential direction, the addendum circle diameter of the lock avoidance teeth is smaller than the addendum circle diameter of teeth other than the lock avoidance teeth, and thus, by locating the lock avoidance tooth at the position of the tooth of the drive gear in a phase that causes the locked state of the tooth of the drive gear and the tooth of the driven gear, the locked state can be suppressed from occurring, the drive gear and the driven gear can mesh smoothly with each other, and the occurrence of abnormal operation (displacement of designated step position) and operation failure can be suppressed.

In the valve drive device according to at least an embodiment of the present invention, the one or more convex units are formed at four places on the drive gear at equal intervals in the circumferential direction, and when the drive gear and the driven gear are in the power non-transmission state and the motor is rotated in the first direction to set the drive gear to an origin position, the lock avoidance tooth is located at a position facing a tooth closest to the non-meshing unit in the driven gear.

According to this aspect, the one or more convex units are formed at four places on the drive gear at equal intervals in the circumferential direction, and when the drive gear and the driven gear are in the power non-transmission state and the motor is rotated in the first direction to set the drive gear to the origin position, the lock avoidance tooth is located at a position facing the tooth closest to the non-meshing unit in the driven gear, and thus, an amount of rotation until the origin position is set in the drive gear can be reduced. As a result, the responsiveness can be improved when driving the valve element in the valve drive device.

In the valve drive device according to at least an embodiment of the present invention, the number of teeth formed on the drive gear is smaller than the number of teeth formed on the driven gear.

According to this aspect, the number of teeth formed on the drive gear is smaller than the number of teeth formed on the driven gear, and thus, the rotation of the motor can be decelerated and transmitted to the driven gear. As a result, large torque can be obtained even with a small power source, and the valve element can be surely driven.

According to at least an embodiment of the present invention, a meshing state between the drive gear and the driven gear is released by the power transmission switching unit by switching from the power transmission state to the power non-transmission state. As a result, it is possible to reduce the possibility of a step-out occurring in the motor, and to suppress noise caused by the step-out or noise generated by rotating the drive gear excessively to determine an origin position of the drive gear.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DETAILED DESCRIPTION

Figure 1:
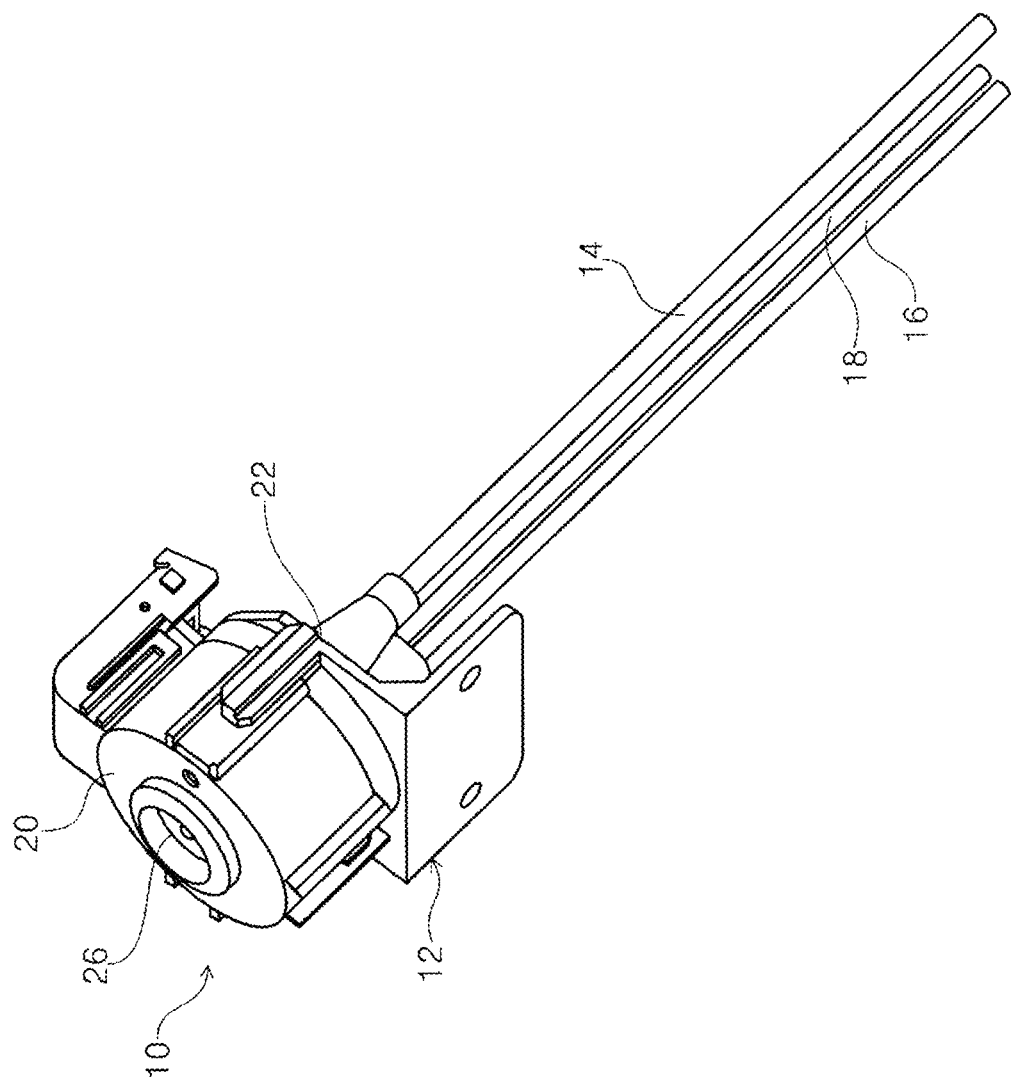
FIG. 1 is a perspective view of a valve drive device according to the present embodiment.

At least an embodiment of the present invention will be described with reference to the drawings, below. It is noted that the same elements in each embodiment are assigned with the same reference numerals and will be described in only the first embodiment, and description of the same elements in the subsequent embodiments will be omitted.

Figure 2:
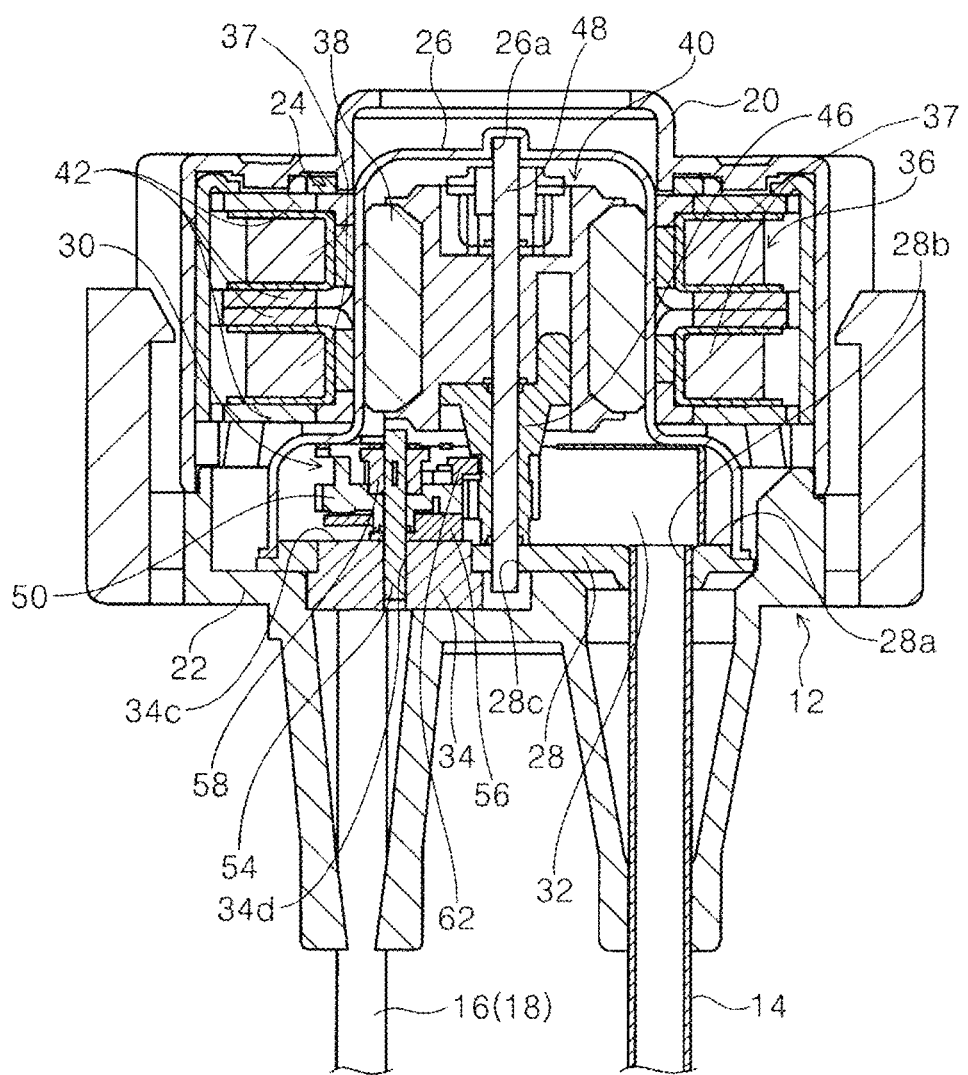
FIG. 2 is a side sectional view of the valve drive device according to the present embodiment.
Figure 3:
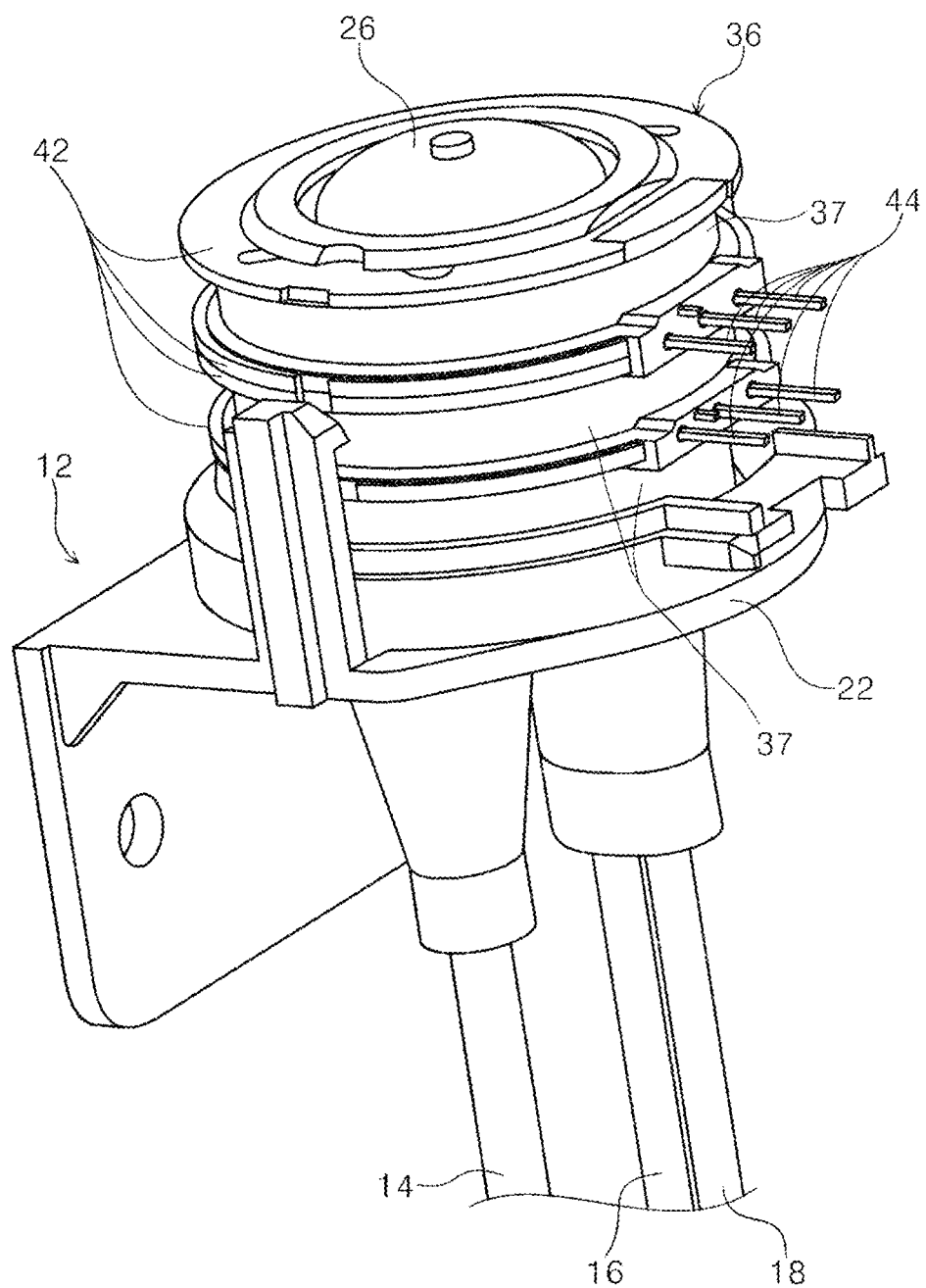
FIG. 3 is a perspective view of a drive coil in the valve drive device.
Figure 4:
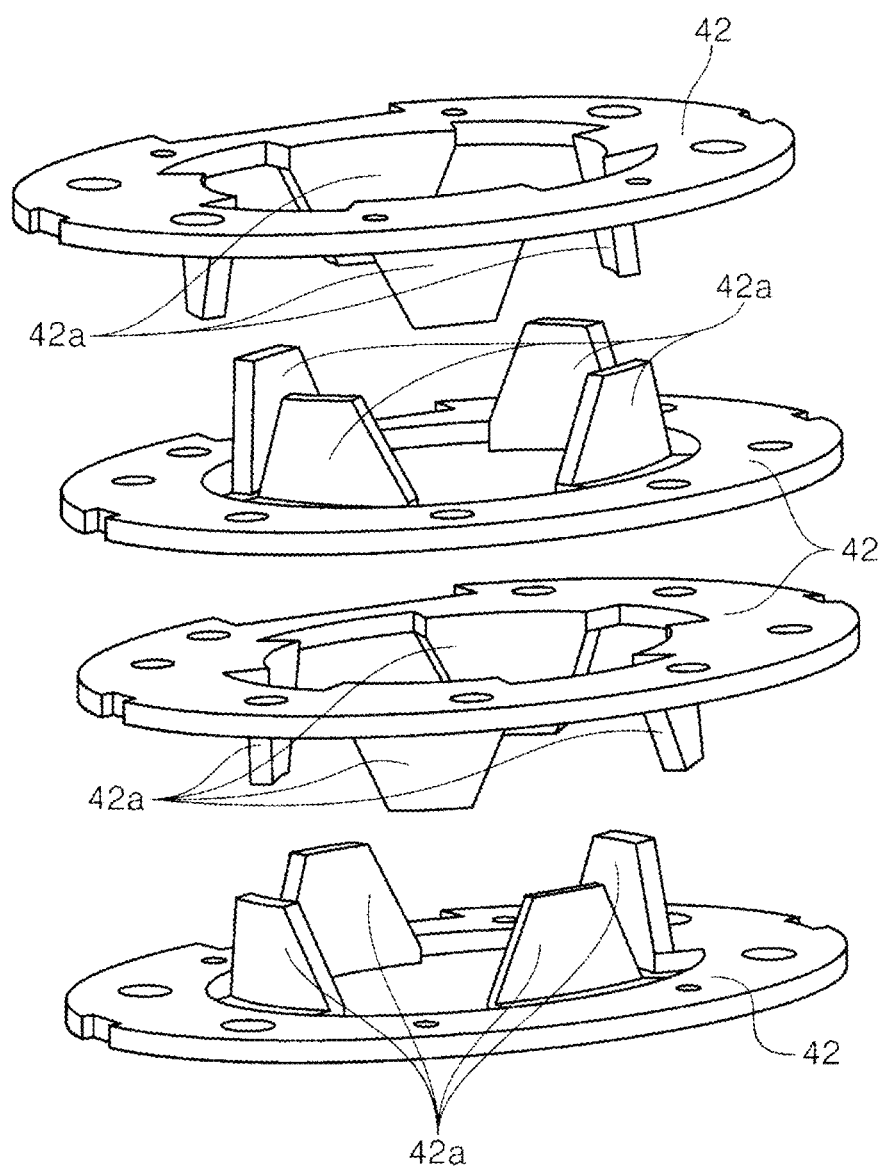
FIG. 4 is an exploded perspective view of a core member that constitutes the drive coil.
Figure 5:
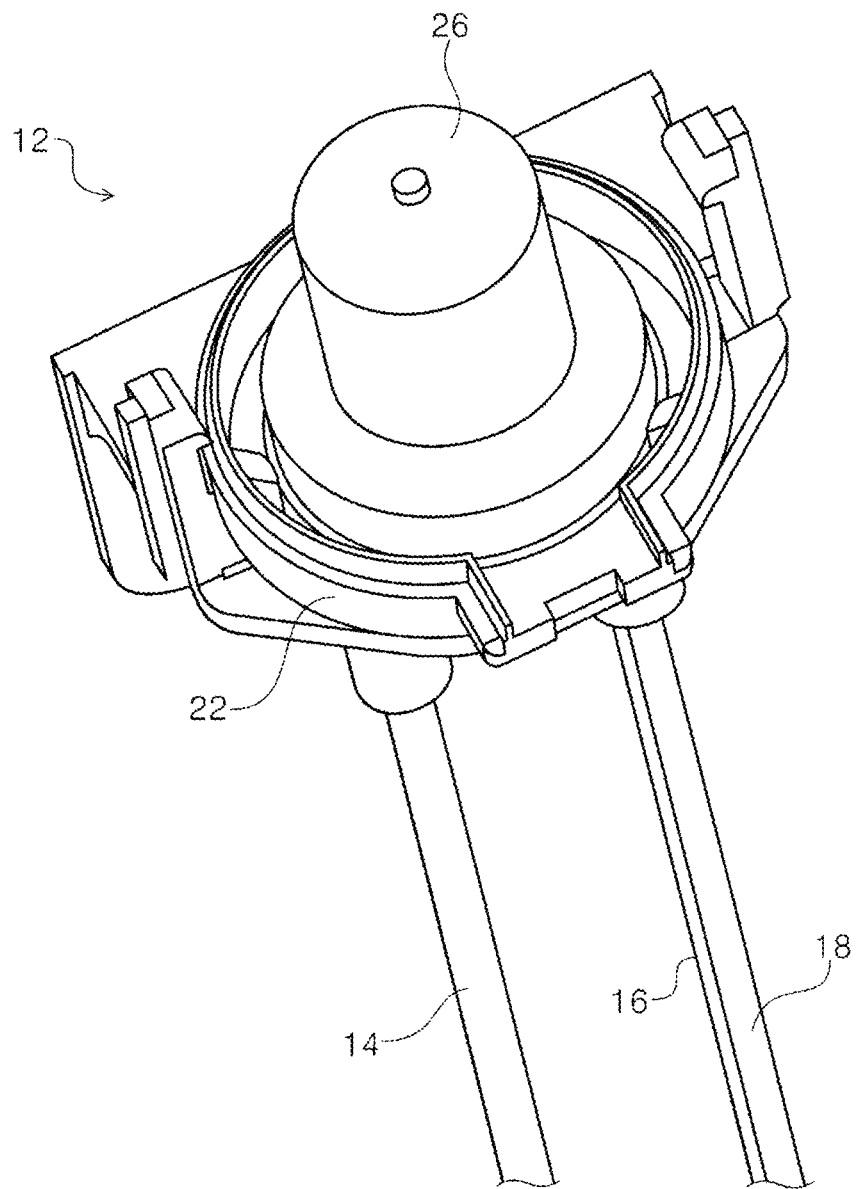
FIG. 5 is a perspective view of a cover defining a valve chamber in the valve drive device.

FIG. 1 is a perspective view of a valve drive device according to the present embodiment; FIG. 2 is a side sectional view of the valve drive device according to the present embodiment; FIG. 3 is a perspective view of a drive coil in the valve drive device; FIG. 4 is an exploded perspective view of a core member that constitutes the drive coil; and FIG. 5 is a perspective view of a cover defining a valve chamber in the valve drive device.

Figure 6:
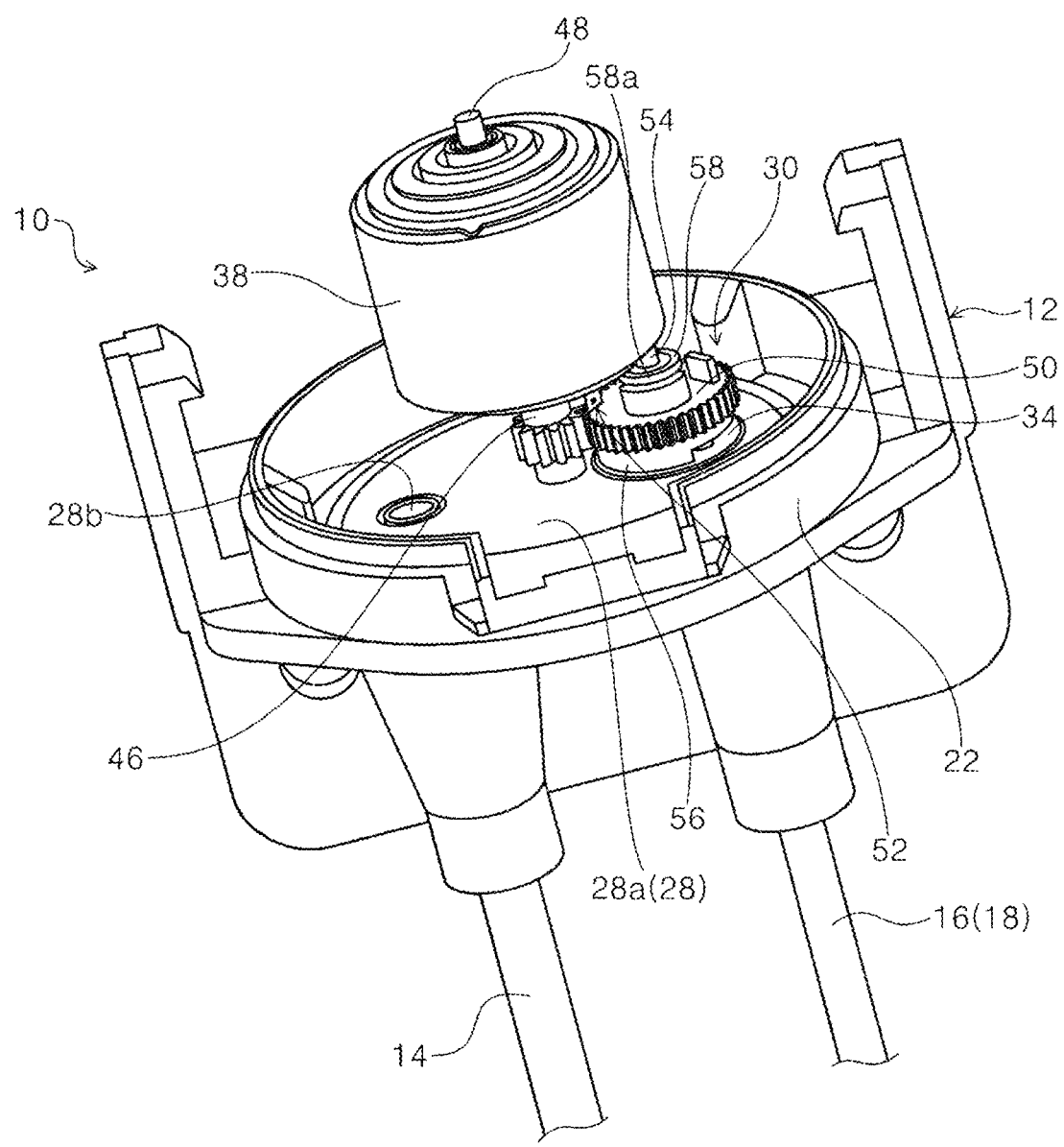
FIG. 6 is a perspective view of a valve element drive mechanism in the valve drive device.
Figure 7:
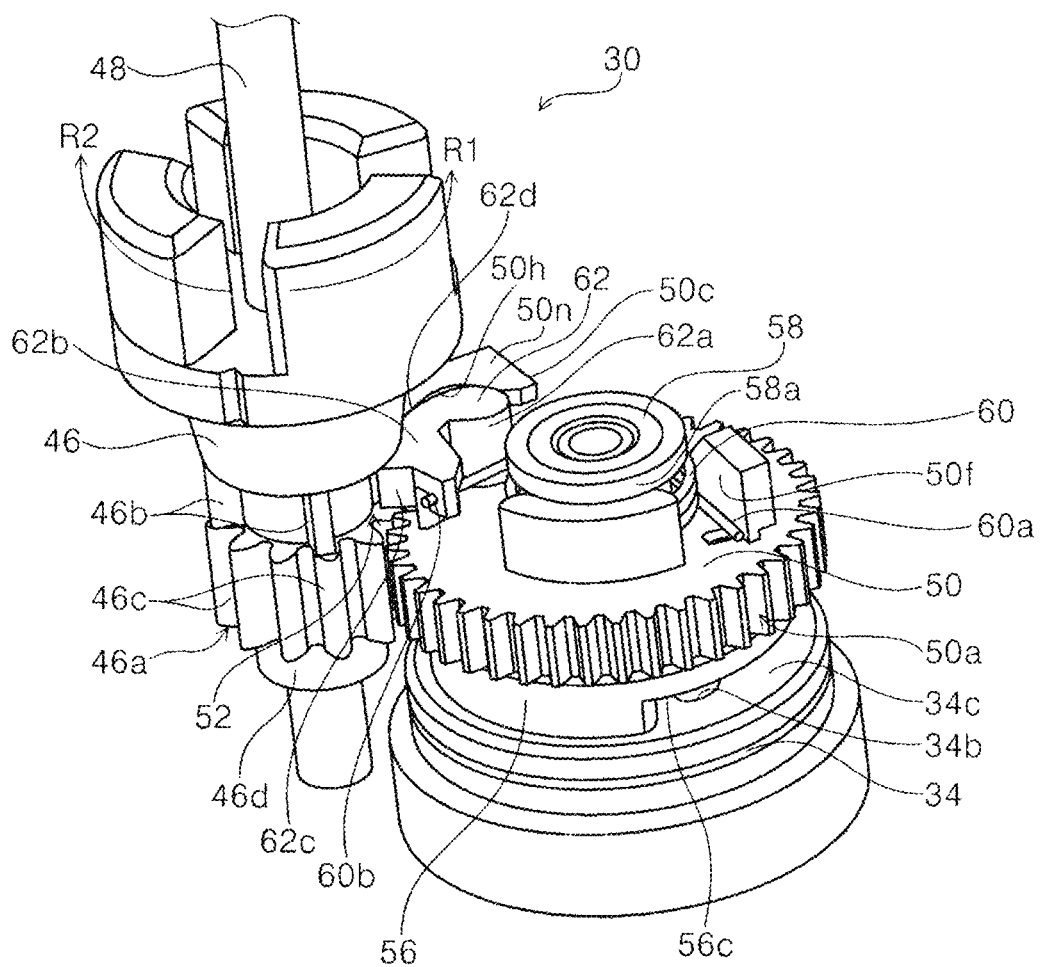
FIG. 7 is a perspective view of the valve element drive mechanism in the valve drive device.
Figure 8:
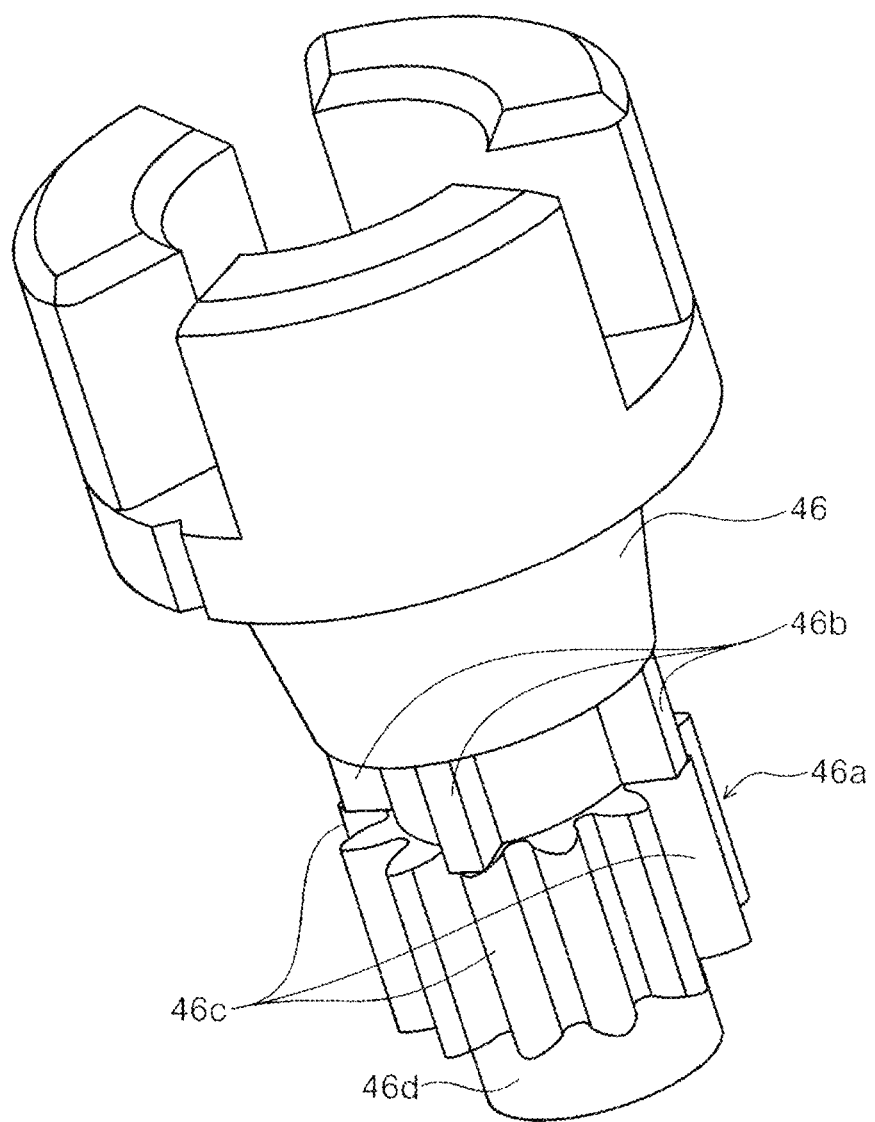
FIG. 8 is a perspective view of an output gear.
Figure 9:
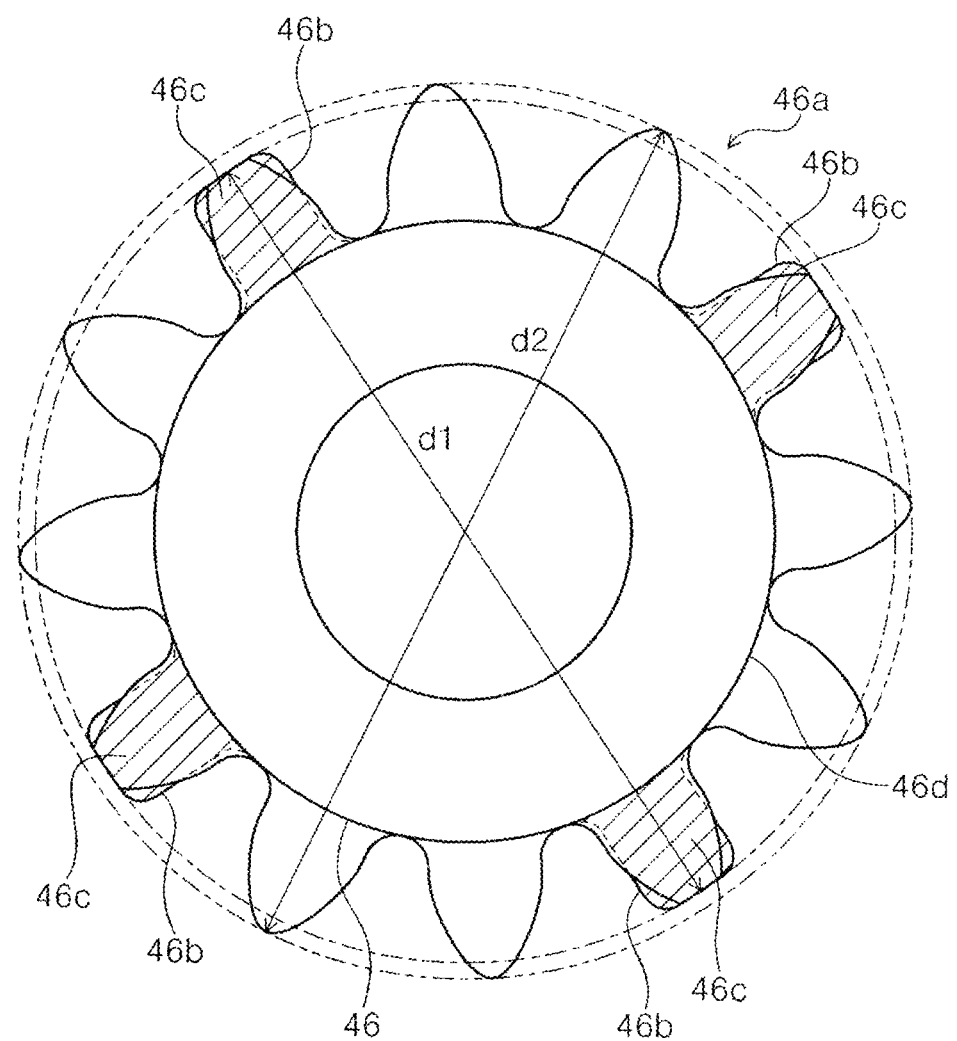
FIG. 9 is a plan view of an output gear.
Figure 10:
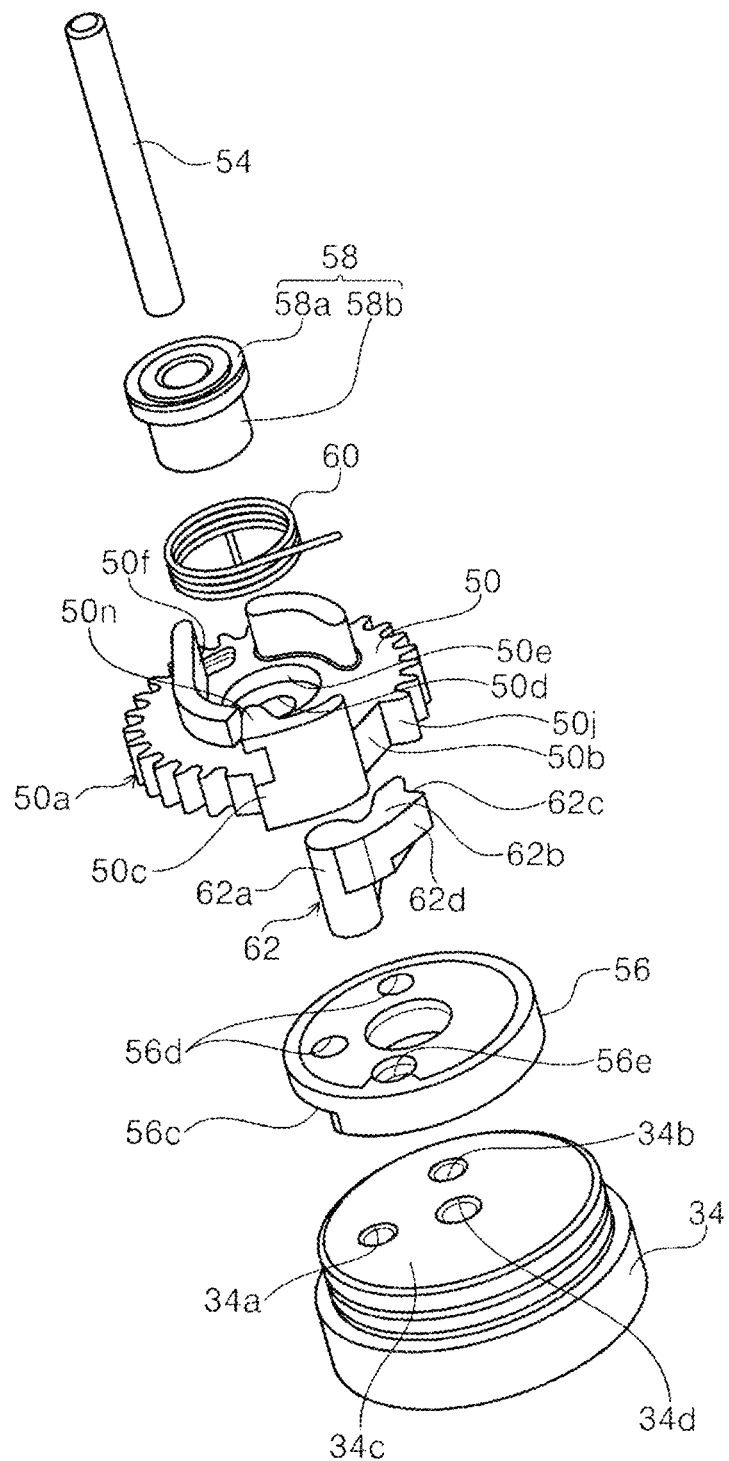
FIG. 10 is an exploded perspective view of a driven portion in the valve element drive mechanism.
Figure 11:
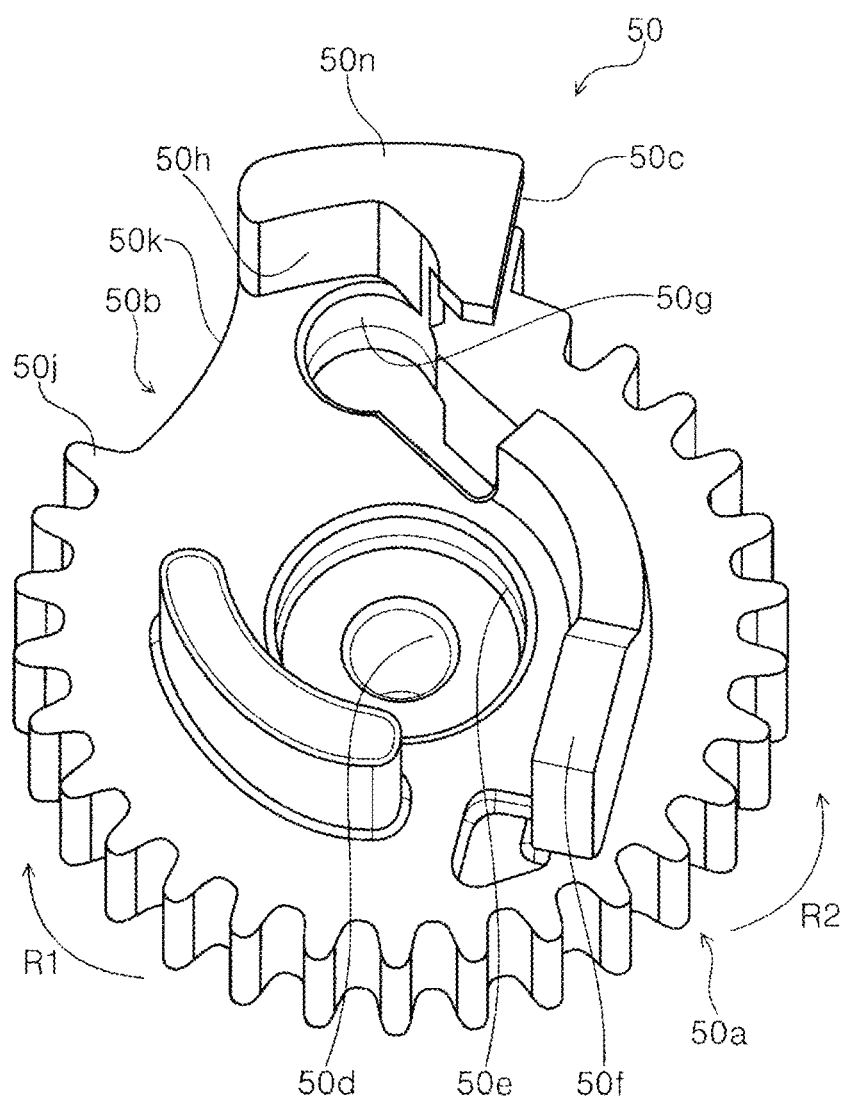
FIG. 11 is a perspective view of a driven gear.
Figure 12:
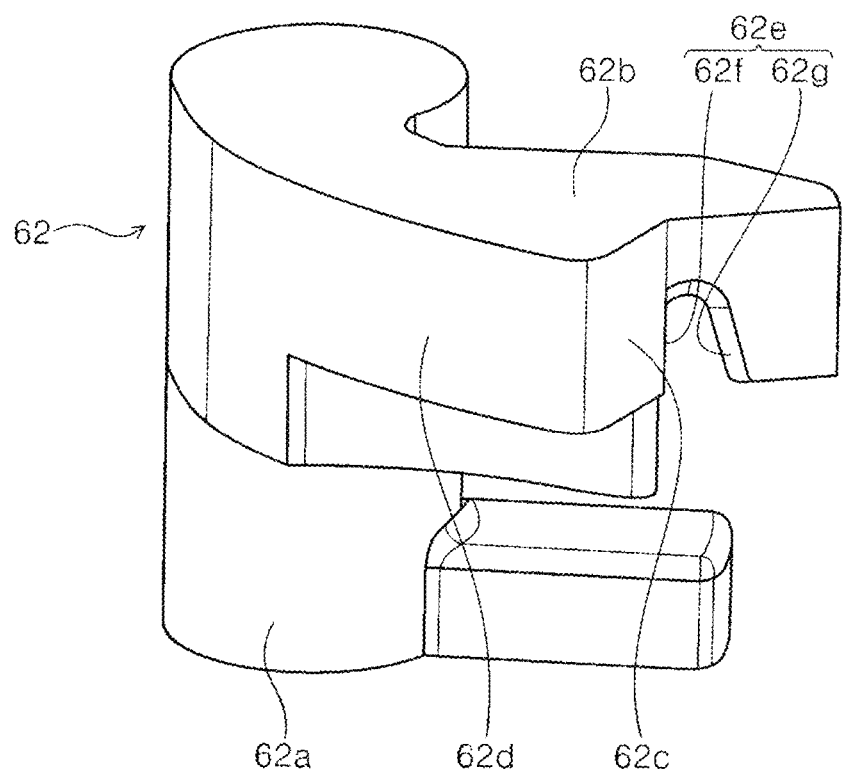
FIG. 12 is a perspective view of a rotation restriction unit.

FIG. 6 and FIG. 7 are perspective views of a valve element drive mechanism in the valve drive device; FIG. 8 is a perspective view of an output gear; FIG. 9 is a plan view of the output gear; FIG. 10 is an exploded perspective view of a driven portion in the valve element drive mechanism; FIG. 11 is a perspective view of a driven gear; and FIG. 12 is a perspective view of a rotation restriction unit.

Figure 13:
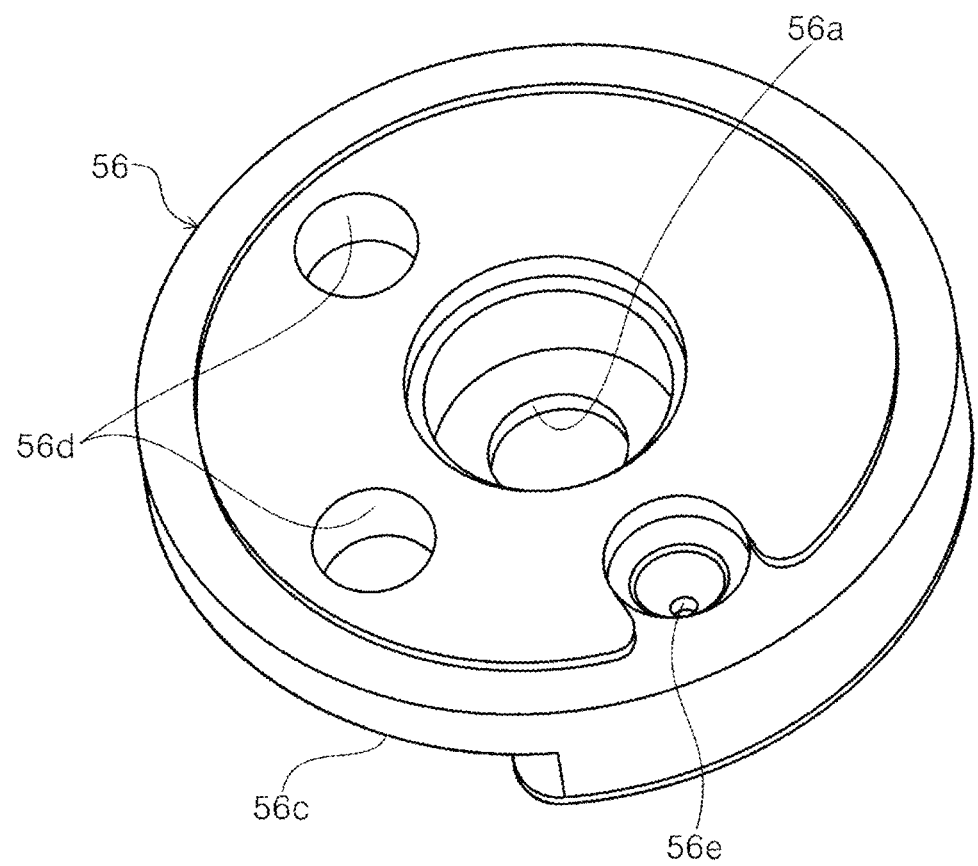
FIG. 13 is a perspective view of a valve element as viewed from the side opposite to a valve seat surface.
Figure 14:
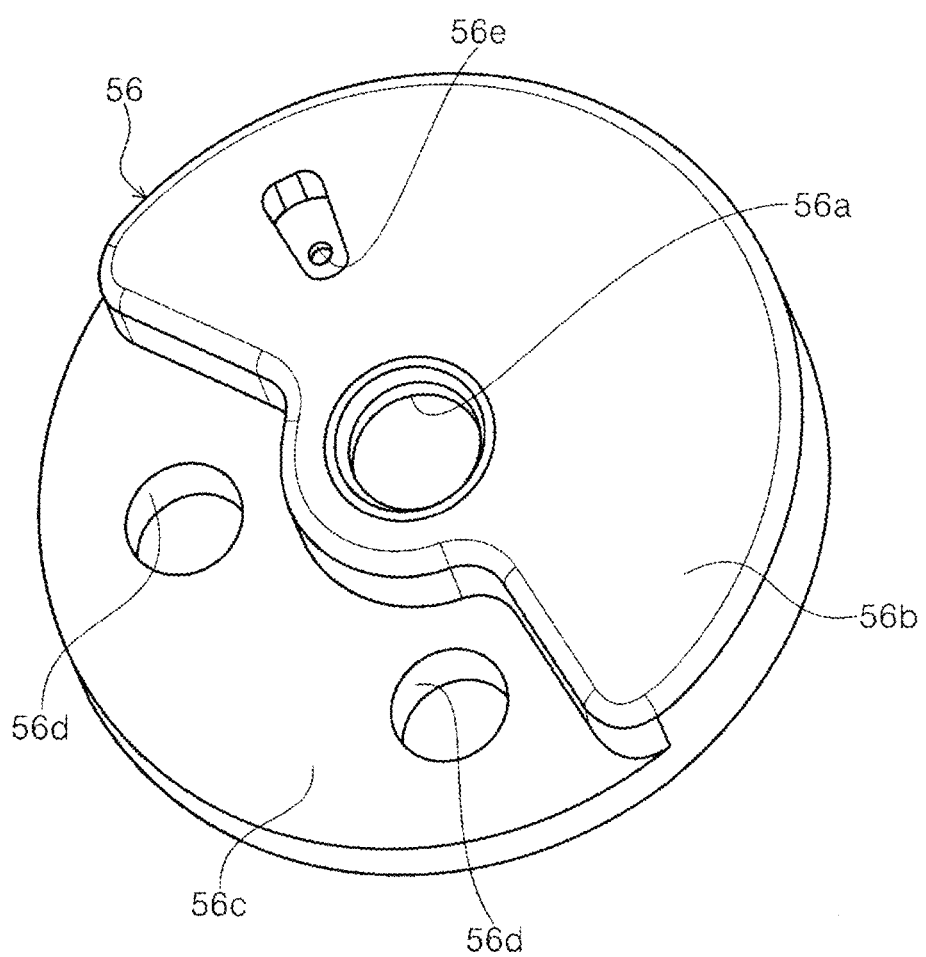
FIG. 14 is a perspective view of the valve element as viewed from the seat surface side.
Figure 15:
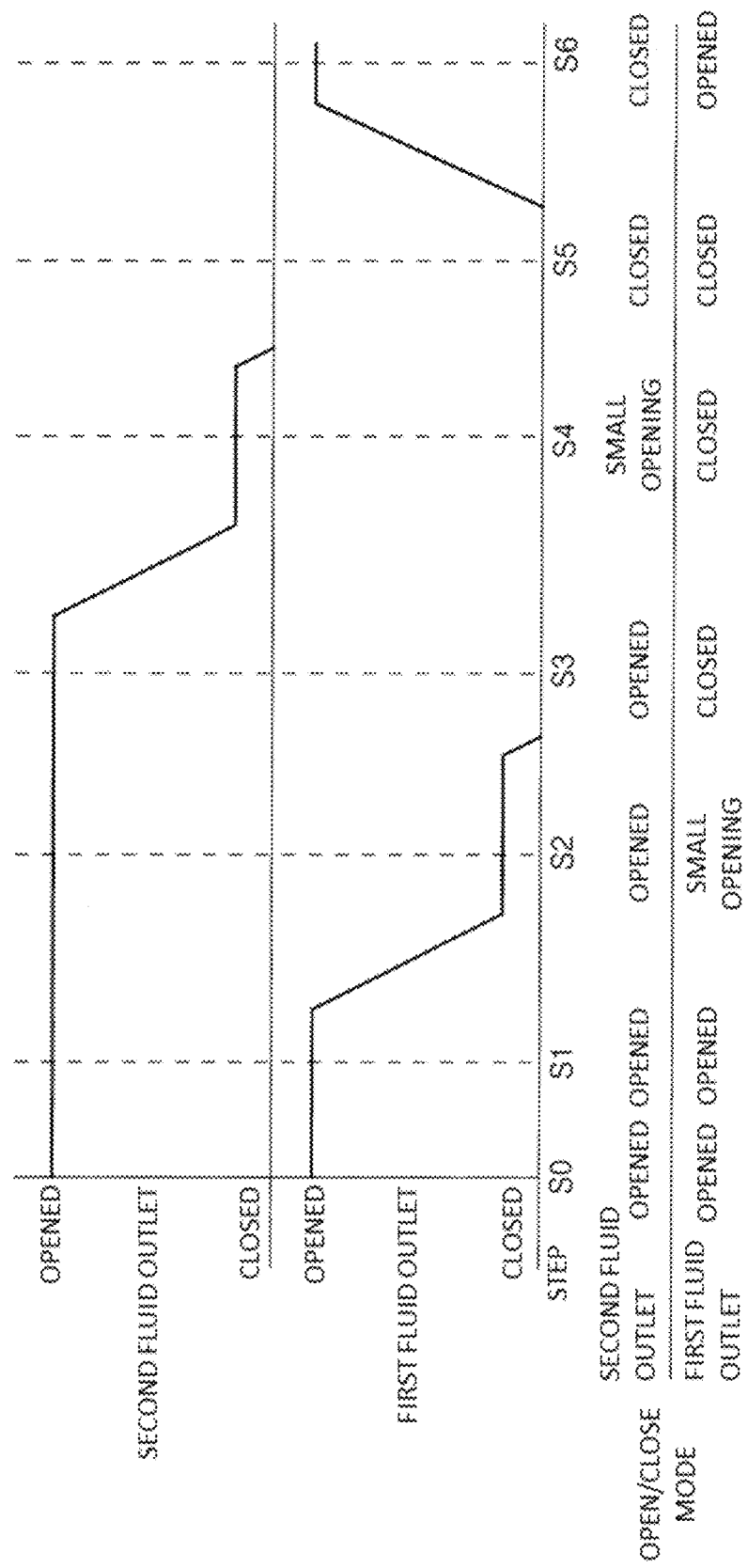
FIG. 15 illustrates diagrams of opened and closed states of a first valve and a second valve in each step.
Figure 16:
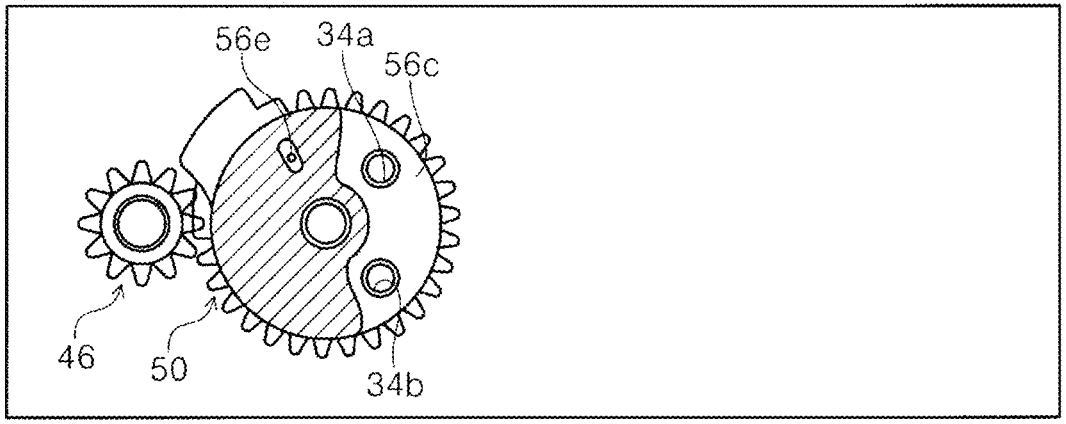
FIG. 16 illustrates diagrams of phase states of the output gear and the driven gear and states of the valve element.
Figure 16:
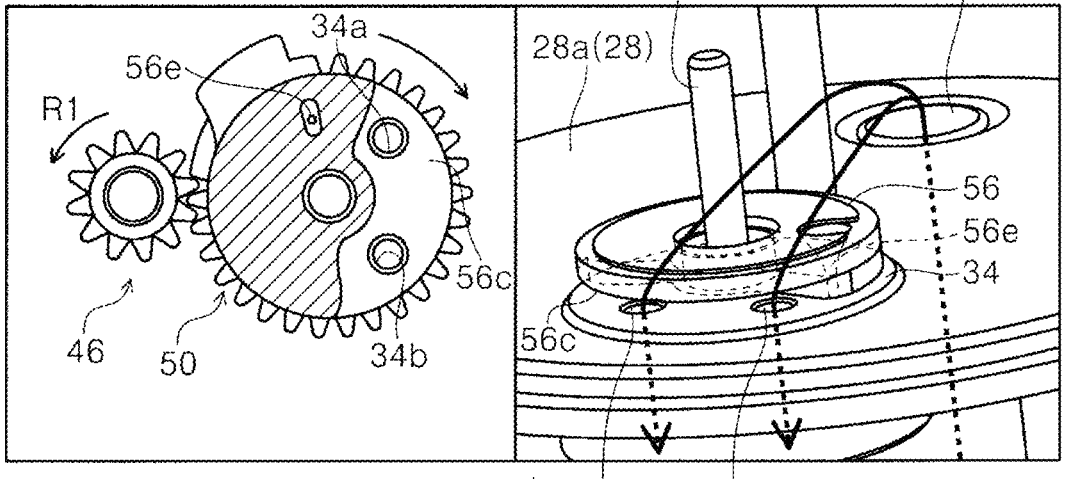
Figure 16:
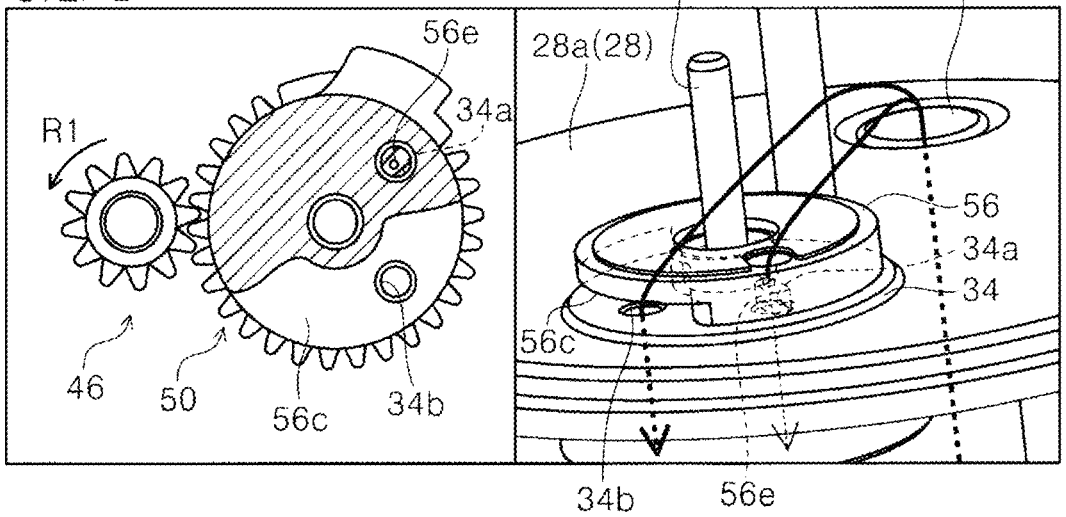
Figure 17:
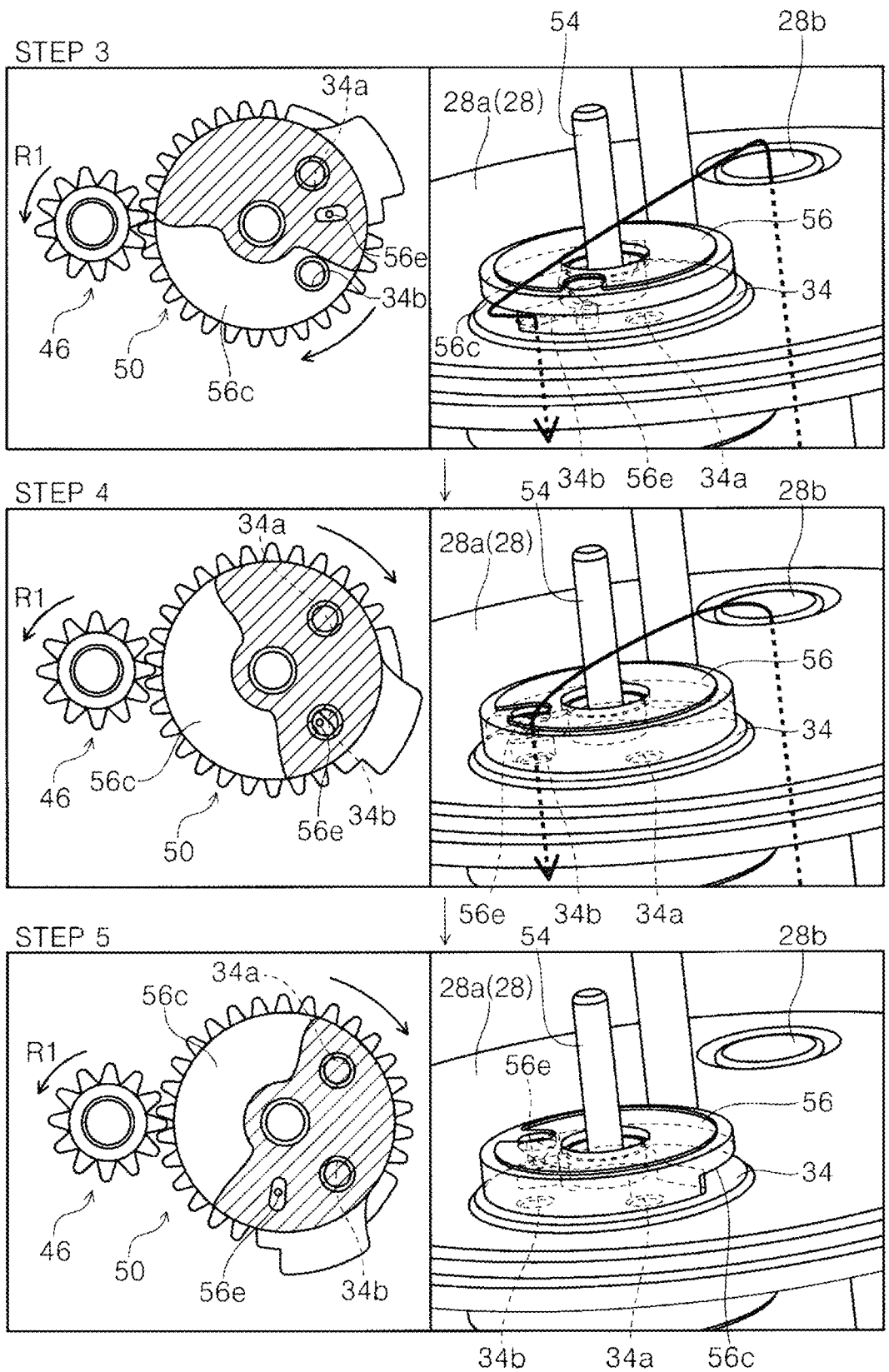
FIG. 17 illustrates diagrams of phase states of the output gear and the driven gear and states of the valve element.
Figure 18:
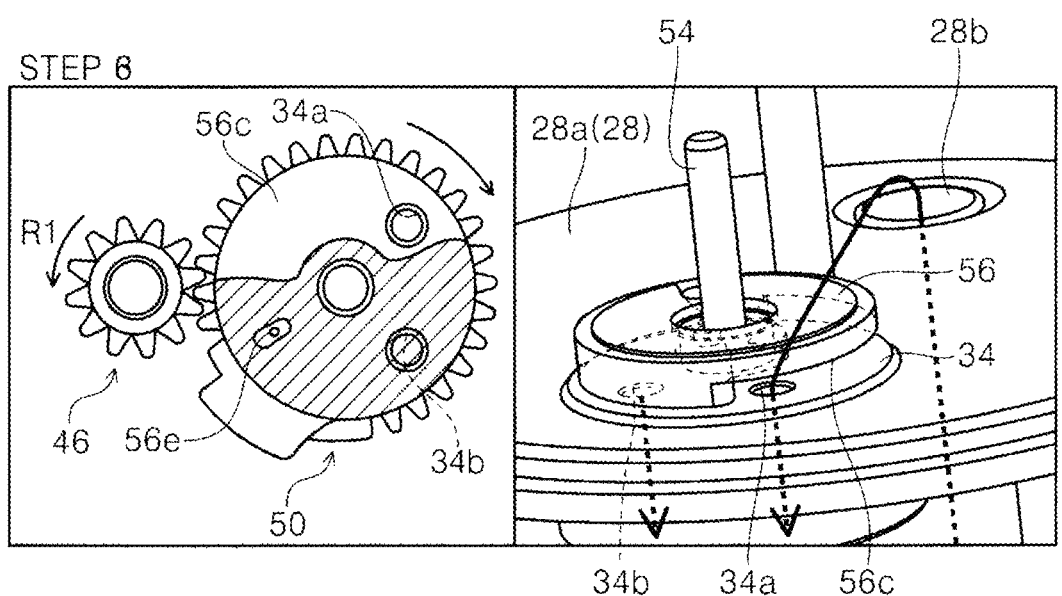
FIG. 18 illustrates diagrams of a phase state of the output gear and the driven gear and a state of the valve element.

FIG. 13 is a perspective view of a valve element as viewed from the side opposite to a valve seat surface; FIG. 14 is a perspective view of the valve element as viewed from the valve seat surface side; FIG. 15 illustrates diagrams of opened and closed states of a first valve and a second valve in each step; and FIG. 16, FIG. 17, and FIG. 18 illustrate diagrams of phase states of the output gear and the driven gear and states of the valve element.

Figure 19:
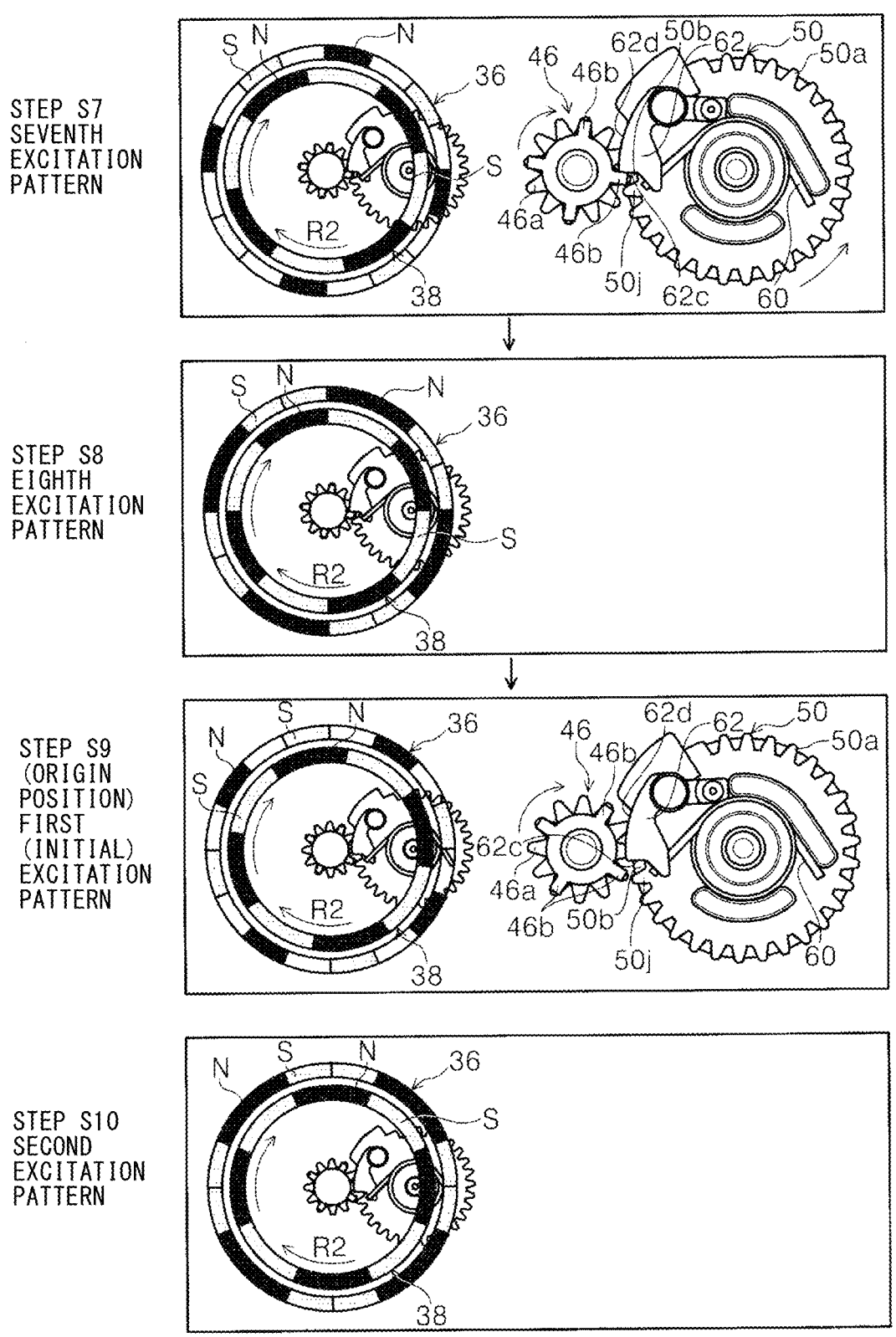
FIG. 19 illustrates diagrams of excitation states of a motor and states of the valve element drive mechanism in an origin returning operation.
Figure 20:
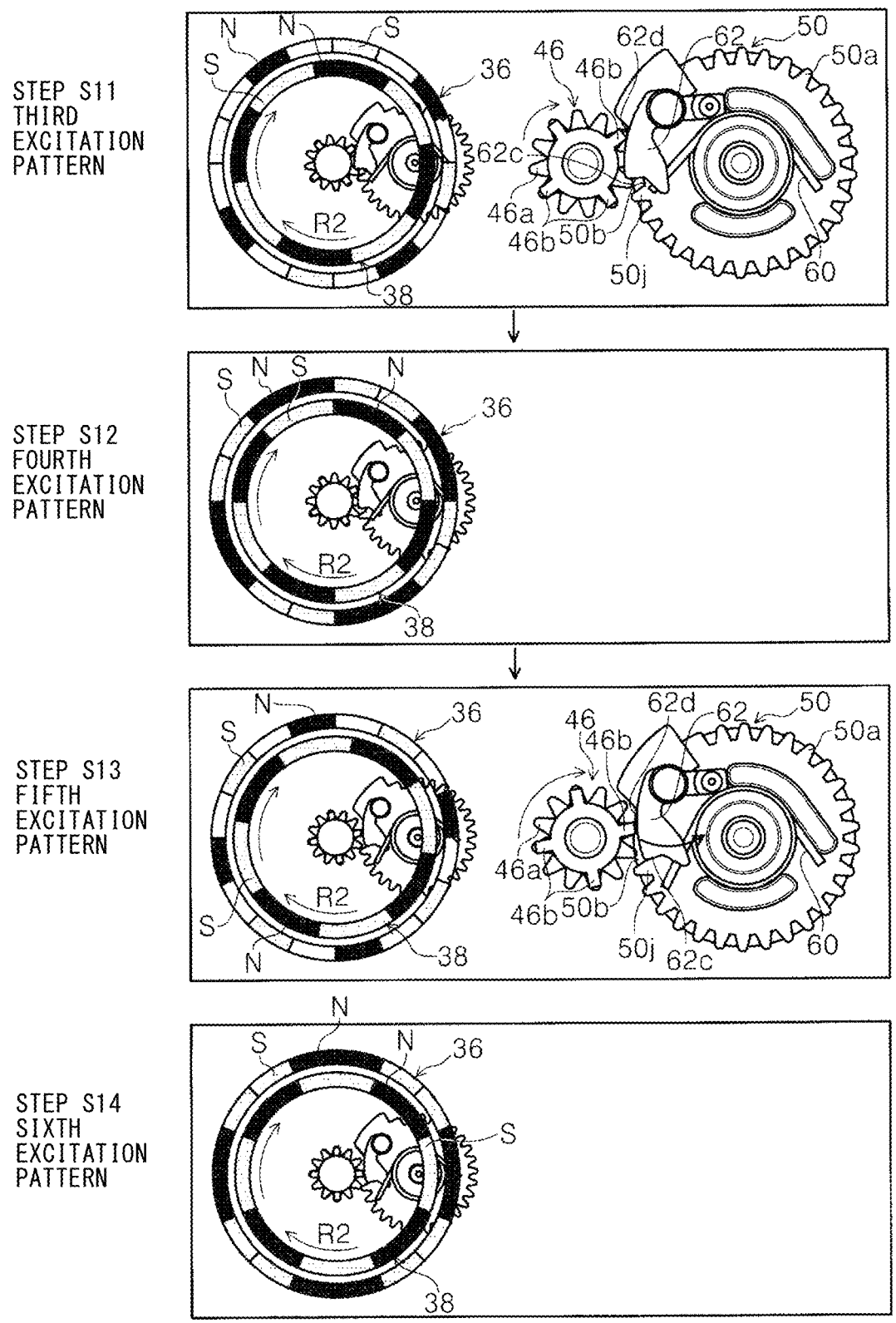
FIG. 20 illustrates diagrams of excitation states of the motor and states of the valve element drive mechanism in the origin returning operation.
Figure 21:
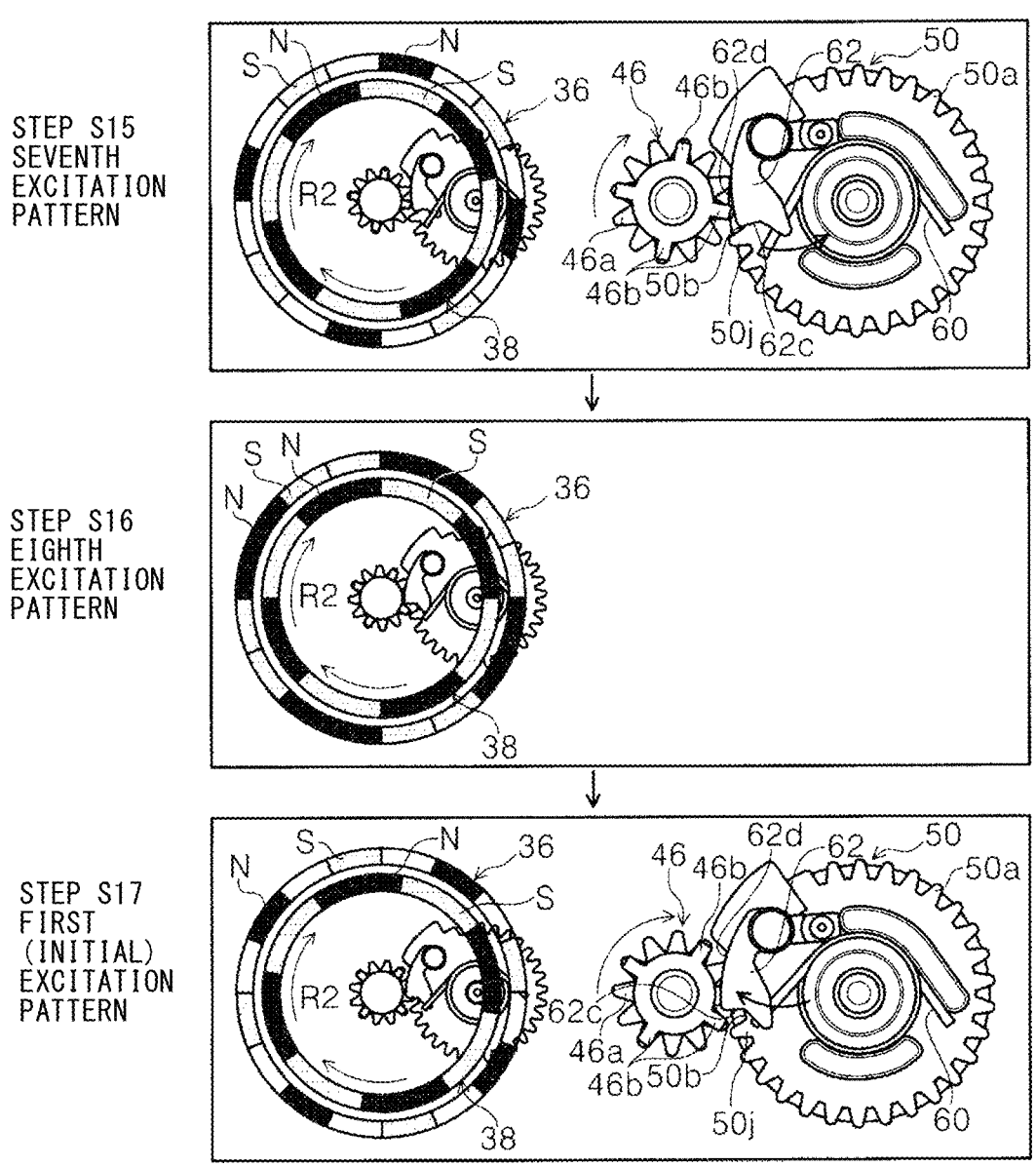
FIG. 21 illustrates diagrams of excitation states of the motor and states of the valve element drive mechanism in the origin returning operation.
Figure 22:
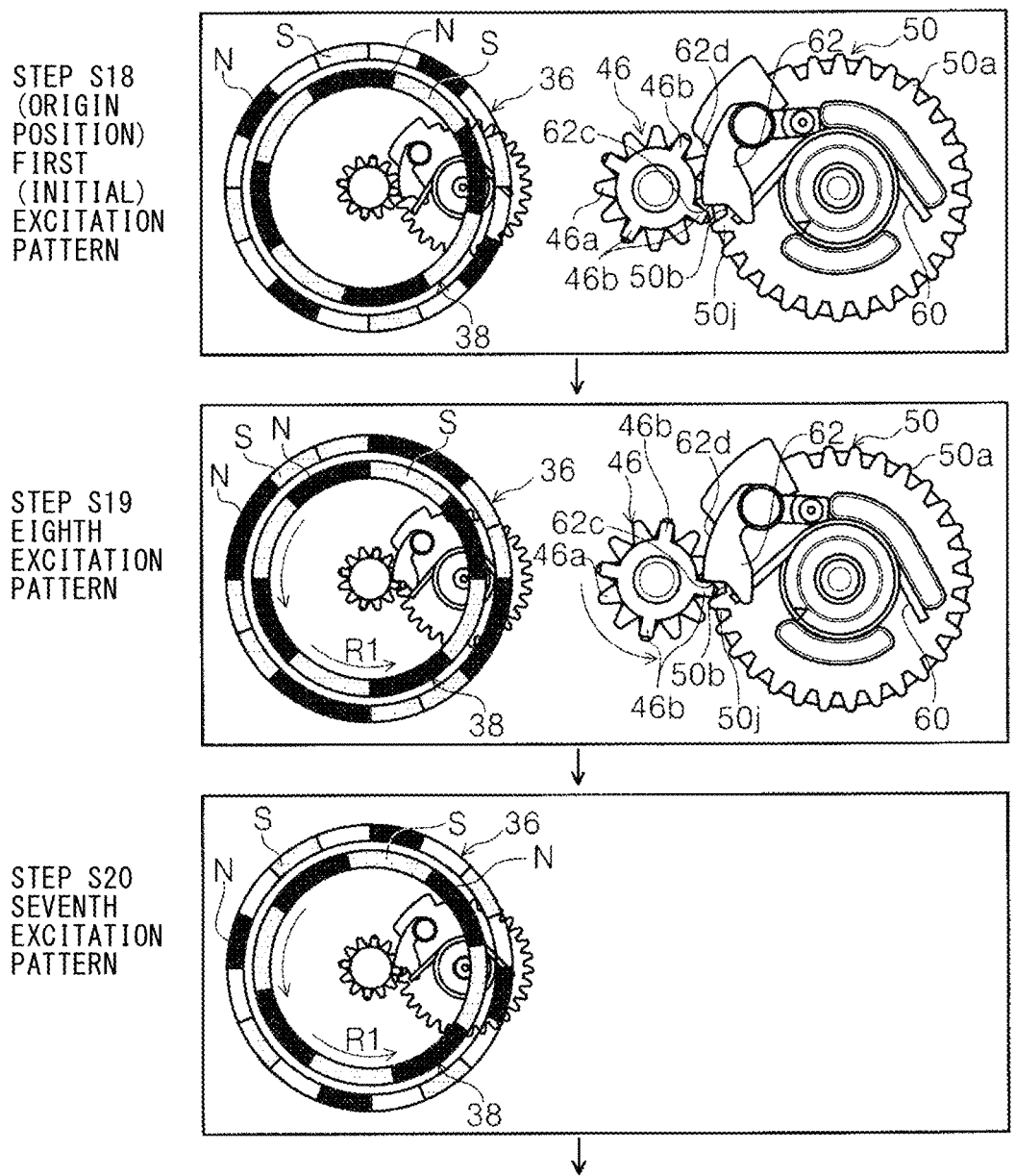
FIG. 22 illustrates diagrams of excitation states of the motor and states of the valve element drive mechanism at the time of driving the valve element.
Figure 23:
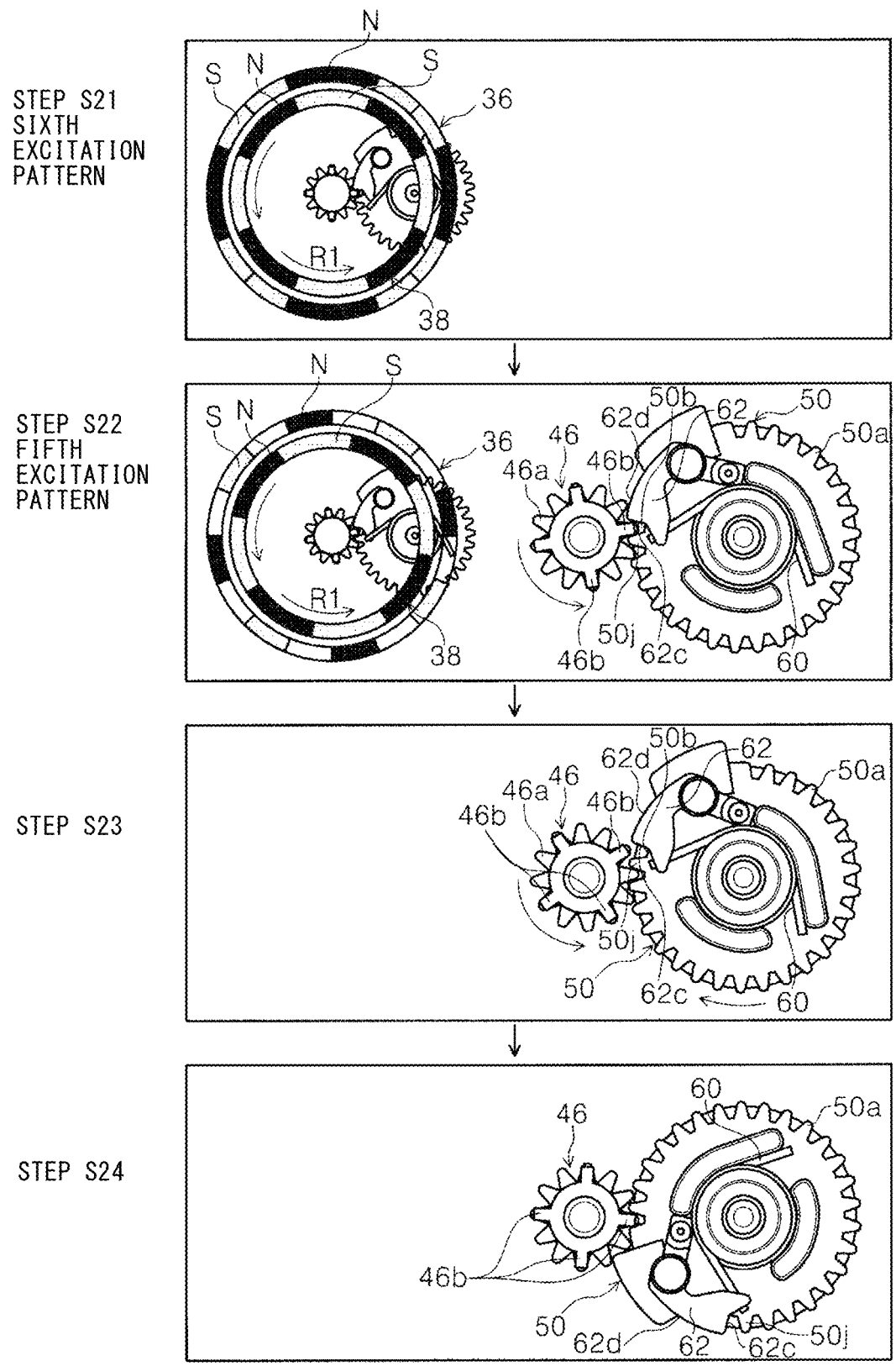
FIG. 23 illustrates diagrams of excitation states of the motor and states of the valve element drive mechanism at the time of driving the valve element.
Figure 24:
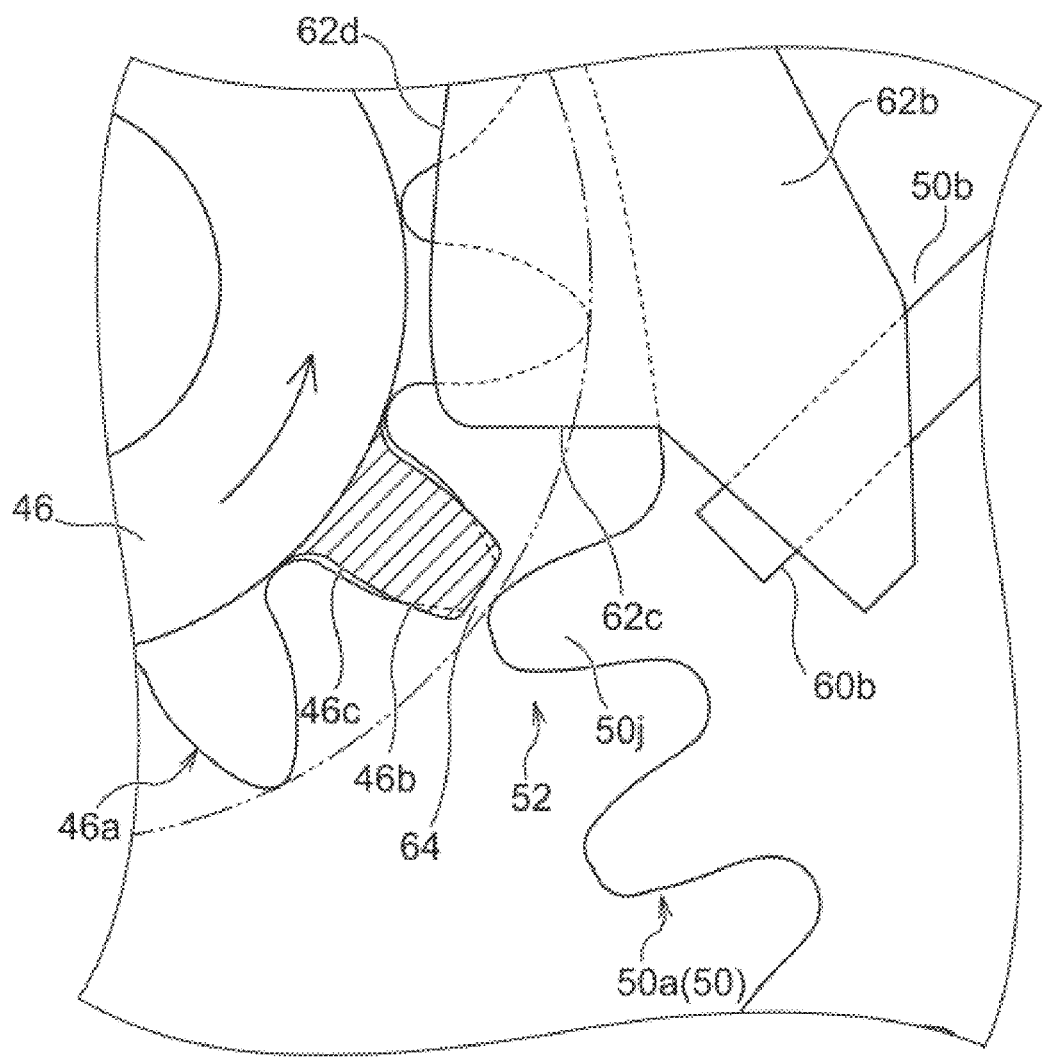
FIG. 24 illustrates a diagram of a relationship between the output gear and the driven gear at an origin position.

FIG. 19, FIG. 20 and FIG. 21 illustrate diagrams of excitation states of a motor and states of the valve element drive mechanism in an origin returning operation; FIG. 22 and FIG. 23 illustrate diagrams of excitation states of the motor and states of the valve element drive mechanism at the time of driving the valve element; and FIG. 24 illustrates a diagram of a relationship between the output gear and the driven gear at an origin position.

Figure 25:
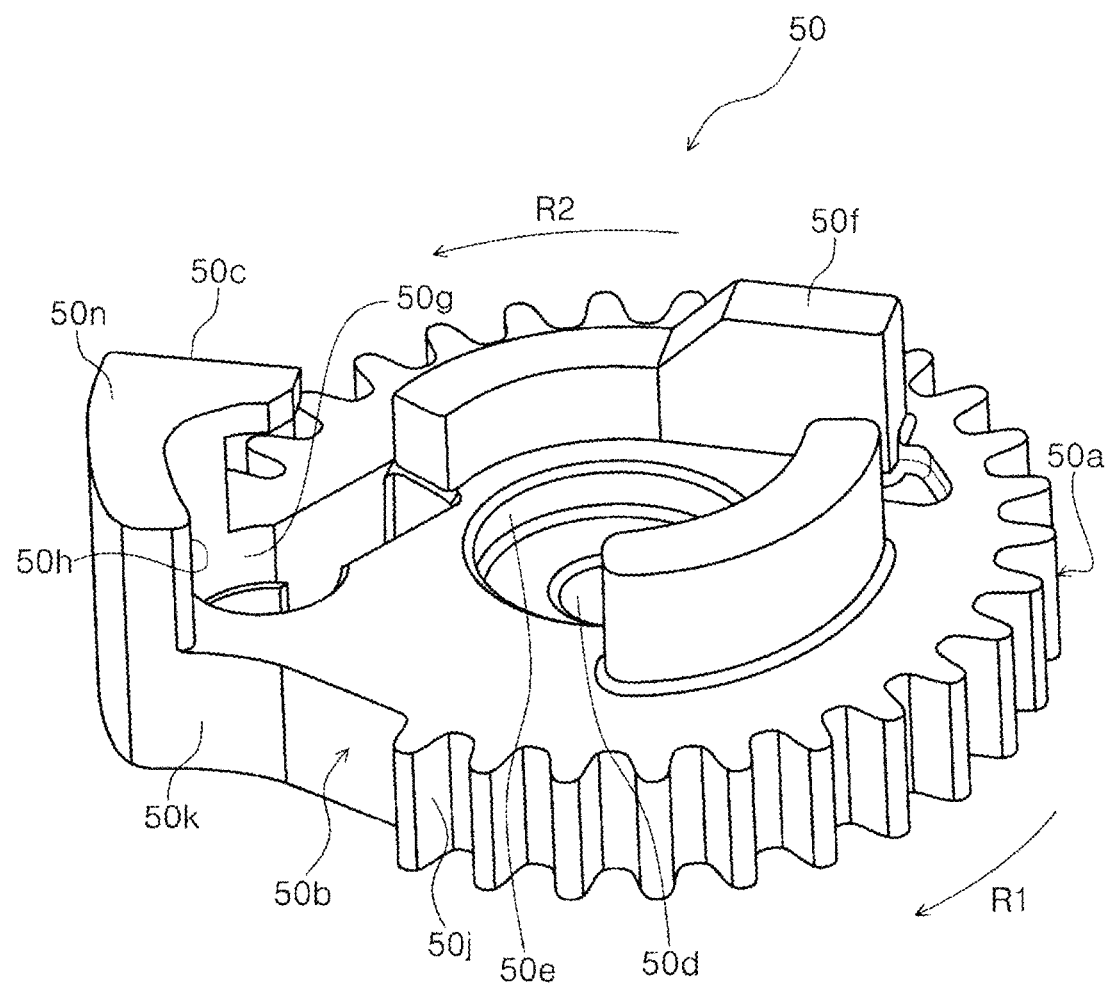
FIG. 25 is a perspective view of the driven gear.
Figure 26A:
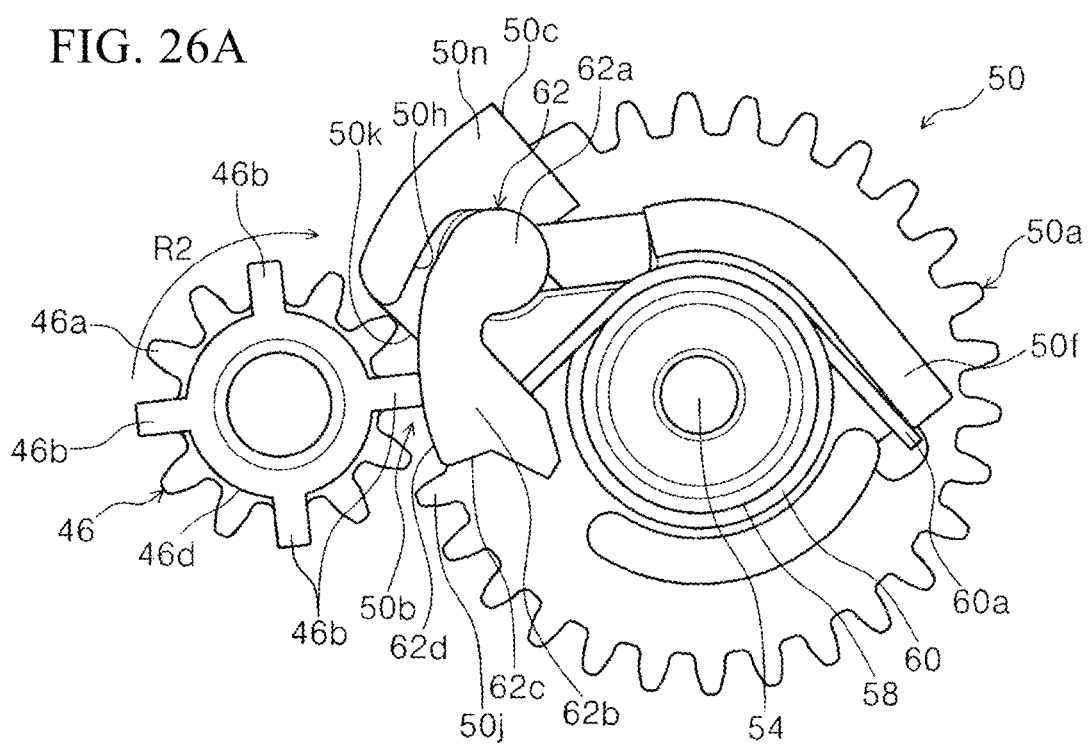
FIG. 26A and FIG. 26B illustrate a diagram of a state where the co-rotation of the driven gear with respect to a drive gear is restricted by a second rotation restriction unit.
Figure 26B:
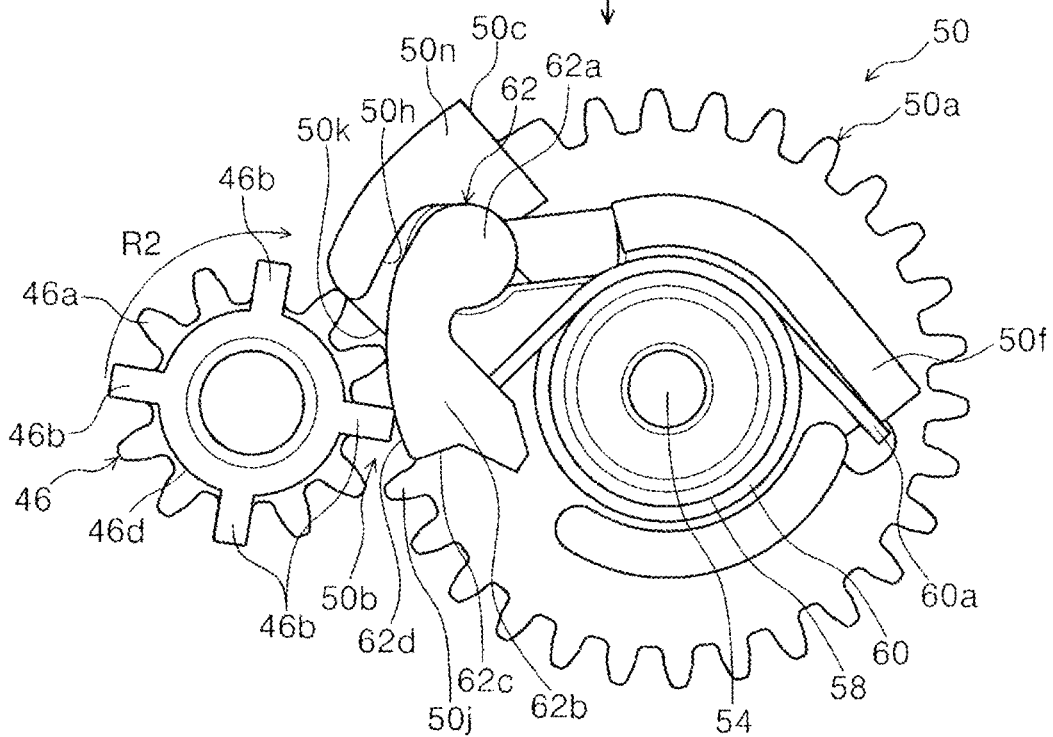
Figure 27:
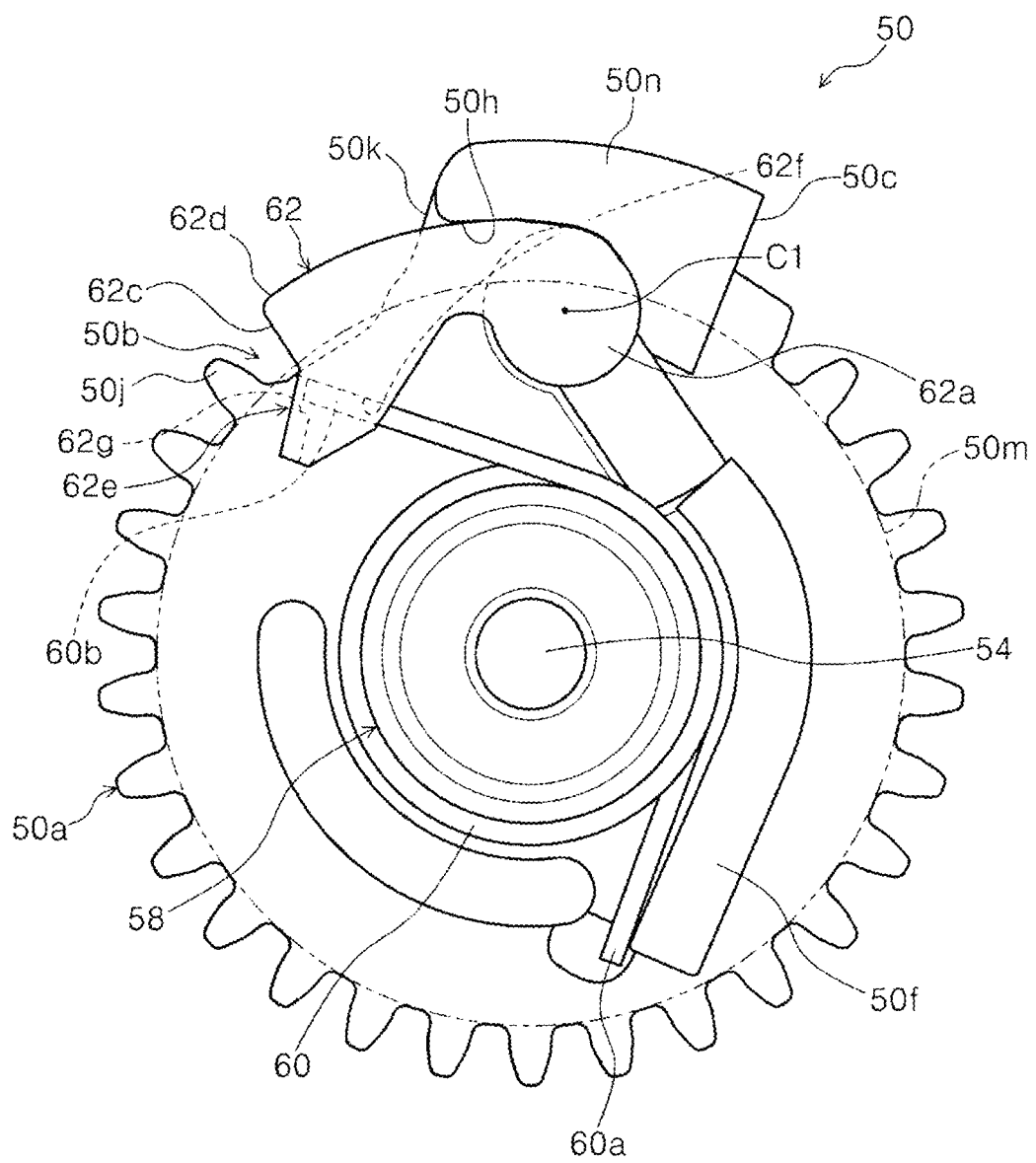
FIG. 27 illustrates a diagram of a relationship of the center position of a pivot shaft of the rotation restriction unit with respect to the driven gear.
Figure 28:
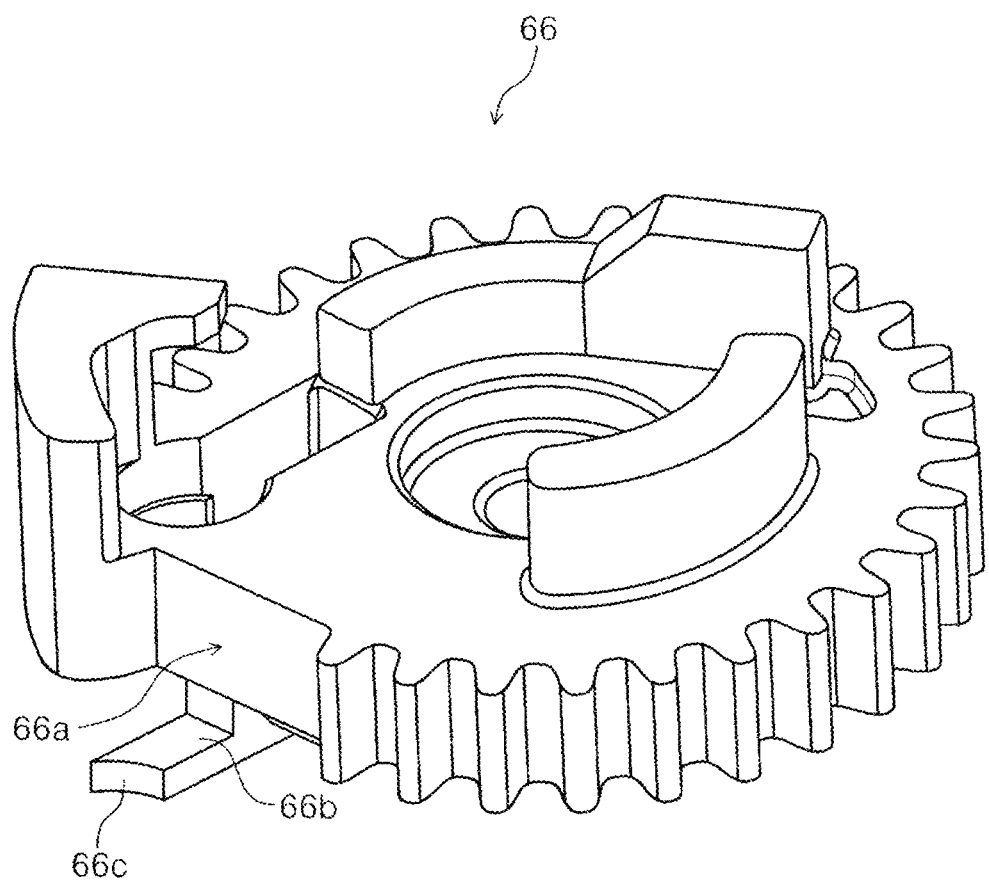
FIG. 28 is a perspective view illustrating another embodiment of the driven gear.

FIG. 25 is a perspective view of the driven gear; FIG. 26A and FIG. 26B illustrate a diagram of a state where the co-rotation of the driven gear with respect to a drive gear is restricted by a second rotation restriction unit; FIG. 27 illustrates a diagram of a relationship of the central position of a pivot shaft of the rotation restriction unit with respect to the driven gear; and FIG. 28 is a perspective view illustrating another embodiment of the driven gear.

Embodiment

Overview of Valve Drive Device

A valve drive device 10 according to the present embodiment will be described with reference to FIG. 1 to FIG. 6. The valve drive device 10 is mounted in a refrigerator as an example, and adjusts the supply amount of a refrigerant (fluid) for cooling inside the refrigerator. The valve drive device 10 includes a valve main body 12, an inflow pipe 14 extending from the valve main body 12, a first outflow pipe 16 and a second outflow pipe 18 which each extend parallel to the inflow pipe 14, and a cover member 20 which covers an upper portion of the valve main body 12. It is noted that in the following description, for convenience, the extending direction of the inflow pipe 14, the first outflow pipe 16, and the second outflow pipe 18 is defined as the up-down direction, the valve main body 12 is defined as the upper side, and the inflow pipe 14, the first outflow pipe 16 and the second outflow pipe 18 are defined as the lower side.

In FIG. 2, the valve main body 12 includes a base member 22, a motor 24, a sealing cover 26 as a "cover", a base main body 28, and a valve element drive mechanism 30. The base main body 28 has an upper surface 28a. The inflow pipe 14, the first outflow pipe 16, and the second outflow pipe 18 are attached to the base main body 28. A sealing cover 26 (FIG. 5) is attached over the base main body 28. The base main body 28 and the sealing cover 26 define a valve chamber 32.

As illustrated in FIG. 6, a fluid inlet 28b is formed on the upper surface 28a. The fluid inlet 28b is in communication with the inflow pipe 14 attached to the base main body 28. A refrigerant (fluid) is supplied from the inflow pipe 14 into the valve chamber 32.

On the other hand, a valve seat constitutional member 34 (see FIG. 2, FIG. 7, FIG. 10, and FIG. 16 to FIG. 18) is attached to the base main body 28. The first outflow pipe 16 and the second outflow pipe 18 are attached to the valve seat constitutional member 34; a first fluid outlet 34a as a "fluid outlet" in communication with the first outflow pipe 16 and a second fluid outlet 34b as a "fluid outlet" in communication with the second outflow pipe 18 are provided in the valve seat constitutional member 34. The fluid supplied from the inflow pipe 14 into the valve chamber 32 flows out from the first fluid outlet 34a to the first outflow pipe 16, or from the second fluid outlet 34b to the second outflow pipe 18. It is noted that in the present embodiment, the base main body 28 and the valve seat constitutional member 34 constitute a "base".

As illustrated in FIG. 2, the motor 24 includes a stator 36 and a rotor 40 to which a drive magnet 38 is attached. The stator 36 is disposed to surround the rotor 40 with the sealing cover 26 interposed therebetween.

In the present embodiment, the stator 36 is provided with four core members 42 as illustrated in FIG. 4. On each of the core members 42, four pole teeth 42a are formed. Therefore, in the present embodiment, the stator 36 has sixteen pole teeth 42a. A winding is wound as a drive coil 37 on each of the core members 42 stacked in the stator 36. One end of the drive coil 37 (winding) wound around the stator 36 is bound and connected to one end of a motor terminal 44 (FIG. 3). The motor terminal 44 is electrically connected to a connector, a board, or the like (not illustrated) to supply power to the stator 36.

As illustrated in FIG. 2 and FIG. 6, the rotor 40 includes the drive magnet 38, a drive gear 46, and a spindle 48. The drive gear 46 and the drive magnet 38 are rotatably attached to the spindle 48. The drive magnet 38 is attached to the drive gear 46. The upper end of the spindle 48 is supported by a bearing unit 26a formed in the sealing cover 26, and the lower end of the spindle 48 is supported by a bearing unit 28c formed in the base main body 28. In the present embodiment, the rotor 40 is configured to rotate within the valve chamber 32 about the spindle 48 as the rotation center by the drive magnet 38 when the stator 36 (drive coil 37) is excited.

Overview of Valve Element Drive Mechanism

A configuration of the valve element drive mechanism 30 will be described with reference to FIG. 6 to FIG. 14. As illustrated in FIG. 6 and FIG. 7, the valve element drive mechanism 30 includes the motor 24, the drive gear 46, a driven gear 50, and a power transmission switching unit 52. The power transmission switching unit 52, which will be described later, is configured to switch between a power transmission state of transmitting power between the drive gear 46 and the driven gear 50 and a power non-transmission state of not transmitting the power.

As illustrated in FIG. 8 and FIG. 9, a gear unit 46a is formed at a lower end of the drive gear 46. A plurality of convex units 46b are formed above the gear unit 46a. The tooth of the gear unit 46a corresponding to the convex unit 46b in the circumferential direction of the drive gear 46 is configured as a lock avoidance tooth 46c.

The plurality of convex units 46b protrude from the main body 46d of the drive gear 46 outward in the radial direction of the drive gear 46. In the present embodiment, the convex unit 46b is formed in a flat plate shape as an example. It is noted that the shape of the convex unit 46b is not limited to a flat plate shape, and may have any shape as long as the convex unit 46b can be engaged with the rotation restriction unit 62 described later. In the present embodiment, the plurality of convex units 46b are each formed at positions corresponding to the N pole or the S pole of the drive magnet 38 in the circumferential direction of the drive gear 46.

In the present embodiment, the number of magnetic poles of the drive magnet 38 is, for example, eight (see FIG. 19 to FIG. 23). Therefore, in the present embodiment, the convex units 46b are provided at four positions in the drive gear 46. Specifically, the convex units 46b are provided at equal intervals in the circumferential direction of the drive gear 46 in the drive gear 46, and in the present embodiment, the convex units 46b, which are formed at four positions, are provided at 90 degrees to each other. In the present embodiment, the convex unit 46b is formed to have a thickness corresponding to the tooth thickness of the tooth of the gear unit 46a of the drive gear 46.

Referring to FIG. 9, in the present embodiment, the addendum circle diameter of the lock avoidance tooth 46c is set to d1. On the other hand, in the gear unit 46a, the addendum circle diameter of teeth other than the lock avoidance tooth is set to d2. In the present embodiment, the addendum circle diameter d1 is set to be smaller than the addendum circle diameter d2. The circle indicated by a dot chain line in FIG. 9 illustrates the addendum circle diameter of the lock avoidance teeth 46c, and the circle indicated by a two-dot chain line illustrates the addendum circle diameter of the teeth other than the lock avoidance tooth 46c.

Then, a configuration of the driven gear 50 side that is driven to rotate with respect to the drive gear 46 will be described. As illustrated in FIG. 2, a spindle 54 is inserted at the radial center of the driven gear 50. The driven gear 50 is configured to be rotatable about the spindle 54. Below the driven gear 50, a valve element 56 is provided. In the present embodiment, the valve element 56 is configured to be rotatable about the spindle 54 integrally with the driven gear 50. Below the valve element 56, the valve seat constitutional member 34 is provided. The upper surface of the valve seat constitutional member 34 is configured as a valve seat surface 34c.

Further, a through hole 34d is formed at the center of the valve seat constitutional member 34, and the spindle 54 is inserted thereinto. It is noted that in FIG. 7, the illustration of the spindle 54 is omitted. In FIG. 7, the arrow with reference numeral R1 indicates a first direction which is one rotation direction of the drive gear 46, and the arrow with reference numeral R2 indicates a second direction which is the other rotation direction of the drive gear 46.

A holding member 58 is attached to an upper portion of the driven gear 50. The spindle 54 is passed through the holding member 58. Further, the holding member 58 is configured as a cylindrical member having a flange unit 58a formed at the upper portion, and a torsion spring 60 as a "urging member" is passed through and held by a cylindrical unit 58b. Further, the lever-shaped rotation restriction unit 62 is attached to the upper portion of the driven gear 50.

Referring to FIG. 7, FIG. 10, FIG. 11, and FIG. 25, the driven gear 50 is formed with a meshing unit 50a in which a plurality of teeth are continuously formed along the circumferential direction on the outer peripheral portion and a non-meshing unit 50b in which no teeth are formed.

Further, in the outer peripheral portion of the driven gear 50, a first rotation restriction unit 50c configured to restrict the rotation of the driven gear 50 in the first direction R1 is provided at an end of the meshing unit 50a on the second direction R2 side; the non-meshing unit 50b is provided at an end of the meshing unit 50a on the first direction R1 side. Furthermore, a second rotation restriction unit 50k as a "co-rotation prevention unit" is provided at an end of the non-meshing unit 50b on the first direction R1 side. It is noted that in FIG. 11, the arrow with reference numeral R1 indicates the driven rotation direction of the driven gear 50 when the drive gear 46 rotates in the first direction, and the arrow with reference numeral R2 indicates the driven rotation direction of the driven gear 50 when the drive gear 46 rotates in the second direction. It is noted that the reference numeral for the second rotation restriction unit 50k is omitted in FIG. 16 to FIG. 23.

It is noted that in the present embodiment, as illustrated mainly in step 50 of FIG. 16, when the reference circle diameter of the drive gear 46 and the reference circle diameter of the driven gear 50 are compared, the reference circle diameter of the driven gear 50 is formed larger. In addition, the number of teeth of the gear unit 46a of the drive gear 46 is smaller than the number of teeth formed on the meshing unit 50a of the driven gear 50. Therefore, in the power transmission state where the gear unit 46a of the drive gear 46 and the meshing unit 50a of the driven gear 50 mesh with each other to rotate, the rotation of the motor 24 can be transmitted to the driven gear 50 at reduced speed, a large torque can thus be obtained even with a small power source, and accordingly, the valve element 56 described later can be surely driven.

Further, as illustrated in FIG. 11, a through hole 50d into which the spindle 54 is inserted is provided at the center of the driven gear 50. Furthermore, a concave unit 50e is formed around the through hole 50d on the upper surface of the driven gear 50 to receive a part of the holding member 58 and engage with the holding member 58. The holding member 58 engaged with the concave unit 50e constitutes a shaft portion of the driven gear 50 as well as the spindle 54 and holds the torsion spring 60.

In addition, an arc-shaped holding unit 50f is provided to surround the concave unit 50e on the upper surface of the driven gear 50. As illustrated in FIG. 7, the holding unit 50f is configured to engage with one end 60a of the torsion spring 60 and hold the one end 60a. Further, on the upper surface of the driven gear 50, a through hole 50g and a lever rotation restriction unit 50h are provided.

Rotation Restriction Unit

Referring to FIG. 12, the rotation restriction unit 62 includes a pivot shaft 62a and a lever unit 62b. On the lever unit 62b, a first contact unit 62c, a second contact unit 62d, and a spring holding unit 62e are provided. The spring holding unit 62e includes a spring contact unit 62f and a spring detachment prevention unit 62g.

As illustrated in FIG. 7, the rotation restriction unit 62 is pivotably attached to an upper portion of the driven gear 50. Specifically, the pivot shaft 62a of the rotation restriction unit 62 is inserted into the through hole 50g (FIG. 11) of the driven gear 50. The rotation restriction unit 62 is configured to pivot the pivot shaft 62a with respect to the driven gear 50.

The other end 60b of the torsion spring 60 contacts the spring contact unit 62f of the spring holding unit 62e of the lever unit 62b of the rotation restriction unit 62, and is pressed by the other end 60b of the torsion spring 60. In the spring holding unit 62e, the spring detachment prevention unit 62g is provided on the opposite side of the spring contact unit 62f with interposing the other end 60b of the torsion spring 60. When the other end 60b of the torsion spring 60 in contact with the spring contact unit 62f is separated from the spring contact unit 62f due to the rotation state of the rotation restriction unit 62, the spring detachment prevention unit 62g prevents the other end 60b of the torsion spring 60 from being detached from the spring holding unit 62e.

In the present embodiment, the rotation restriction unit 62 receives an urging force of the torsion spring 60 so that the second contact unit 62d of the lever unit 62b presses the lever rotation restriction unit 50h in contact with the lever rotation restriction unit 50h of the driven gear 50. That is, the lever unit 62b of the rotation restriction unit 62 is urged outward in the radial direction of the driven gear 50 by the urging force of the torsion spring 60, and the pivoting outward in the radial direction is restricted at the position where the second contact unit 62d contacts the lever rotation restriction unit 50h.

On the other hand, when the second contact unit 62d is pressed inward in the radial direction of the driven gear 50 against the urging force of the torsion spring 60, the rotation restriction unit 62 pivots inward in the radial direction of the driven gear 50 about the pivot shaft 62a. When the pressure inward in the radial direction against the second contact unit 62d is released, the lever unit 62b pivots back to the position where the second contact unit 62d contacts the lever rotation restriction unit 50h by the urging force of the torsion spring 60.

In the present embodiment, the driven gear 50 is formed with a convex-shaped unit 50n protruding outward in the radial direction and upward in the thickness direction. On one side of the convex-shaped unit 50n in the circumferential direction of the driven gear 50, the first rotation restriction unit 50c is formed; on the other side, the second rotation restriction unit 50k is formed. In the convex-shaped unit 50n, the lever rotation restriction unit 50h is formed on the inner side of the driven gear 50 in the radial direction. In the convex-shaped unit 50n, the lever rotation restriction unit 50h is formed to be concave outward in the radial direction to receive a portion of the pivot shaft 62a and a portion of the lever unit 62b of the lever-shaped rotation restriction unit 62.

Valve Element

The valve element 56 will be described with reference to FIG. 10, FIG. 13 and FIG. 14. As illustrated in FIG. 13 and FIG. 14, the valve element 56 is configured as a disc-like member. A through hole 56a is provided at a center of the valve element 56. The spindle 54 is inserted into the through hole 56a. The lower surface of the valve element 56 is configured as a sliding surface 56b sliding on the valve seat surface 34c of the valve seat constitutional member 34. In the valve element 56, a portion of the sliding surface 56b is cut away to form a cutout unit 56c.

As illustrated in FIG. 14, the cutout unit 56c has a shape that is concave upward with respect to the sliding surface 56b of the valve element 56. It is noted that two through holes 56d are provided in the cutout unit 56c. In the present embodiment, as an example, bosses (not illustrated) protruding from the lower surface of the driven gear 50 are inserted into the through holes 56d, so that the driven gear 50 and the valve element 56 are integrally rotatable.

Further, on the valve element 56, an orifice 56e that penetrates in the up-down direction and opens at the sliding surface 56b is provided. In the present embodiment, the orifice 56e has a portion narrower than the first fluid outlet 34a and the second fluid outlet 34b in the fluid path. It is noted that more preferably, the orifice 56e has a narrowest portion in the fluid path.

The configuration described above is a main configuration of the valve drive device 10 and the valve element drive mechanism 30, and the following will describe control of fluid of the valve element 56 by the valve element drive mechanism 30, and the power transmission state and the power non-transmission state of the drive gear 46 and the driven gear 50 in order.

Fluid Control by Valve Element

Flow rate control of fluid from the fluid inlet 28b to at least one of the first fluid outlet 34a and the second fluid outlet 34b will be described with reference to FIG. 15 to FIG. 18. In step S0 of FIG. 16, the drive gear 46 is located at the origin position with respect to the driven gear 50. The relationship between the teeth of the drive gear 46 and the teeth of the driven gear 50 at the origin position will be described later.

As illustrated in FIG. 16, in step S0 (origin position), the cutout unit 56c of the valve element 56 is located above the first fluid outlet 34a and the second fluid outlet 34b. Accordingly, since the valve element 56 does not close the first fluid outlet 34a and the second fluid outlet 34b, the first fluid outlet 34a and the second fluid outlet 34b are in the opened state. Thus, the fluid supplied from the fluid inlet 28b into the valve chamber 32 flows out to the first outflow pipe 16 and the second outflow pipe 18 through the first fluid outlet 34a and the second fluid outlet 34b (see opening/closing mode of FIG. 15).

Then, the motor 24 is rotationally driven to rotate the drive gear 46 as well as the rotor 40 in the first direction R1. At this time, the driven gear 50 meshing with the drive gear 46 is also driven to rotate (in the clockwise direction in FIG. 16) and shifts to the state of step S1 (the center diagram in FIG. 16). The driven rotation of the driven gear 50 causes the valve element 56 to slide against the valve seat constitutional member 34 in the clockwise direction in FIG. 16 with the sliding surface 56b in close contact with the valve seat surface 34c. Also in step S1, since the cutout unit 56c is located above the first fluid outlet 34a and the second fluid outlet 34b, the first fluid outlet 34a and the second fluid outlet 34b open, that is, are in the opening mode in FIG. 15.

As illustrated in the lower diagram of FIG. 16, when the drive gear 46 is further rotated in the first direction R1, the state of step S1 is shifted to the state of step S2. In this state, the orifice 56e is located above the first fluid outlet 34a, and the cutout unit 56c is located above the second fluid outlet 34b. The first fluid outlet 34a is in a state where the flow rate of the fluid flowing out from the first fluid outlet 34a is restricted by the orifice 56e.

That is, the flow rate of the fluid flowing out from the first fluid outlet 34a restricted by the orifice 56e is lower than the flow rate of the fluid flowing out from the first fluid outlet 34a in the completely opened state as in steps S0 and S1. That is, this corresponds to a slightly opening mode in step S2 of FIG. 15. The second fluid outlet 34b is in the opened state, and thus is in an opening mode.

Then, as illustrated in the upper diagram in FIG. 17, when the drive gear 46 is further rotated in the first direction R1, the state of step S2 is shifted to the state of step S3. In this state, the orifice 56e is out of the position above the first fluid outlet 34a. The first fluid outlet 34a is covered with and closed by the sliding surface 56b of the valve element 56. Accordingly, the first fluid outlet 34a is in a closing mode (FIG. 15), and the path of fluid from the valve chamber 32 to the first outflow pipe 16 is blocked. On the other hand, the cutout unit 56c is located above the second fluid outlet 34b. Accordingly, the second fluid outlet 34b is open, and thus is in the opening mode (FIG. 15).

Then, as illustrated in the center diagram of FIG. 17, when the drive gear 46 is further rotated in the first direction R1, the state of step S3 is shifted to the state of step S4. In this state, the first fluid outlet 34a is covered with and closed by the sliding surface 56b of the valve element 56. Accordingly, the first fluid outlet 34a maintains the state of the closing mode (FIG. 15) continuing from step S3, and the state where the path of fluid from the valve chamber 32 to the first outflow pipe 16 is blocked is maintained.

Furthermore, the orifice 56e is located above the second fluid outlet 34b. Accordingly, the second fluid outlet 34b is in a state where the flow rate of the fluid flowing out from the second fluid outlet 34b is restricted by the orifice 56e, and the second fluid outlet 34b is in the slightly opening mode in step S4 of FIG. 15.

Then, as illustrated in the lower diagram of FIG. 17, when the drive gear 46 is further rotated in the first direction R1, the state of step S4 is shifted to the state of step S5. In the state of step S5, the first fluid outlet 34a and the second fluid outlet 34b are covered with the sliding surface 56b of the valve element 56 and are in the closed state. That is, this corresponds to the closing mode in step S5 of FIG. 15. In this state, the path of fluid from the valve chamber 32 to the first outflow pipe 16 and the second outflow pipe 18 is blocked.

Then, as illustrated in FIG. 18, when the drive gear 46 is further rotated in the first direction R1, the state of step S5 is shifted to the state of step S6. In the state of step S6, the cutout unit 56c is again located above the first fluid outlet 34a. Accordingly, the first fluid outlet 34a is completely open, and is in the opening mode in FIG. 15. On the other hand, the second fluid outlet 34b maintains the closed state where it is covered with the sliding surface 56b of the valve element 56, and thus, the state where the path of fluid from the valve chamber 32 to the second outflow pipe 18 is blocked is maintained. That is, this corresponds to the closing mode in step S6 of FIG. 15.

In the present embodiment, the valve element 56 is rotated with respect to the valve seat constitutional member 34 by the motor 24 so that each of the first fluid outlet 34a and the second fluid outlet 34b can be switched to the opened state, the slightly opened state, or the closed state, and thus, the flow rate of the fluid flowing out from the valve chamber 32 to each of the first outflow pipe 16 and the second outflow pipe 18 can be adjusted.

Excitation Pattern of Drive Coil

Then, the origin position returning operation of the power transmission switching unit 52 of the valve element drive mechanism 30 will be described with reference to FIG. 19 to FIG. 21. In the left side diagrams of FIG. 19 to FIG. 21, the left side diagrams schematically illustrate the position of the magnetic poles of the drive magnet 38 according to the excitation pattern of the stator 36, and the right side diagrams schematically illustrate states of the power transmission switching unit 52 corresponding to the left side diagrams. It is noted that as an example, in the stator 36 and the drive magnet 38, areas solid-filled with black dots each indicate the S pole and areas filled with black each indicates the N pole; in the stator 36, areas not filled each indicate a non-excited state.

In the present embodiment, sixteen pole teeth 42a of the stator 36 are provided, and the magnetic poles of the drive magnet 38 are set to eight. In the following description, the rotor 40 is rotated by exciting each of the pole teeth 42a of the stator 36 with eight excitation patterns. Hereinafter, in steps S9 and S17 in FIG. 19 to FIG. 21, the excitation pattern of the stator 36 is defined as an initial excitation pattern, that is, a first excitation pattern, and the position of the magnetic poles of the drive magnet 38 in the first excitation pattern of the stator 36 is defined as the origin position.

The rotor 40 rotates in the second direction R2 from step S7 in FIG. 19 to step S17 in FIG. 21. The first excitation pattern (see step S9), which is the initial excitation pattern, indicates an excited state where the S pole and the N pole are each excited at four poles and there is one non-excited pole tooth 42a between the pole tooth 42a excited to the S pole and the pole tooth 42a excited to the N pole.

Next, in a second excitation pattern (see step S10), the non-excited pole tooth 42a located on the second direction R2 side of the pole tooth 42a excited to the S pole or the N pole is excited to the S pole or the N pole. Specifically, the pole tooth 42a located on the second direction R2 side of the pole tooth 42a excited to the S pole is excited to the S pole, and the pole tooth 42a located on the second direction R2 side of the pole tooth 42a excited to the N pole is excited to the N pole. Then, in a third excitation pattern (see step S11 in FIG. 20), the pole teeth excited in the first excitation pattern are brought into the non-excited state. Thus, the third excitation pattern indicates a state where the polarity goes forward by one pole tooth in the second direction R2, which is the rotation direction of the rotor 40, with respect to the first excitation pattern.

Thereafter, when the state is shifted from the third excitation pattern of step S11 to a fourth excitation pattern of step S12 and then a fifth excitation pattern of step S13, the polarity goes forward by one pole tooth in the second direction R2, which is the rotation direction of the rotor 40. Likewise, when the state is shifted from the fifth excitation pattern of step S13 to a sixth excitation pattern of step S14 and then a seventh excitation pattern of step S15, the polarity goes forward by one pole tooth in the second direction R2, which is the rotation direction of the rotor 40; when the state is shifted from the seventh excitation pattern of step S15 to an eighth excitation pattern of step S16 and then a ninth excitation pattern of step S17, the polarity goes forward by one pole tooth in the second direction R2, which is the rotation direction of the rotor 40.

In the present embodiment, when the excitation is sequentially performed from the first excitation pattern (step S9) to the eighth excitation pattern (step S16) in the stator 36, the excitation pattern returns to the first excitation pattern. During the eight excitation patterns, the pole tooth 42a excited to the S pole or the N pole in the first excitation pattern is bought into a state where the polarity goes forward by four pole teeth on the second direction R2 side.

On the other hand, the drive magnet 38 has eight poles. In the first excitation pattern (step S9) of the stator 36, in the drive magnet 38, a portion having a polarity (N pole) opposite to the polarity (for example, S pole) of the excited pole tooth 42a of the stator 36 is located at a position facing the pole tooth 42a. In step S9, the pole tooth 42a excited to the S pole of the stator 36 faces a portion with the N pole of the drive magnet 38, and the pole tooth 42a excited to the N pole of the stator 36 faces a portion with the S pole of the drive magnet 38.

The excited pole teeth 42a in the stator 36 is increased by one on the second direction R2 side when the first excitation pattern is switched to the second excitation pattern, and thus, the drive magnet 38 also moves in the second direction R2 by one excited pole tooth. Thus, the drive magnet 38 moves in the second direction R2 each time the excitation pattern of the stator 36 is switched. Accordingly, by sequentially switching the excitation pattern from the first excitation pattern to the eighth excitation pattern of the stator 36, the rotor 40 as well as the drive magnet 38 rotates in the second direction R2.

Switching From the Power Transmission State to the Power Non-Transmission State

In step S7, the drive gear 46 rotates in the second direction R2. In the state of step S7, the gear unit 46*a* of the drive gear 46 meshes with the meshing unit 50*a* of the driven gear 50. It is noted that step S7 indicates the middle of returning to the origin position by switching the rotation direction to the second direction after the drive gear 46 is rotated toward the first direction R1 side to rotate the driven gear 50 to be driven.

When the state is shifted to step S9 through step S8, the drive gear 46 returns to the origin position with respect to the driven gear 50. Here, the origin position indicates a state where the meshing state between the gear unit 46*a* of the drive gear 46 and the meshing unit 50*a* of the driven gear 50 is released, and the gear unit 46*a* is located within the non-meshing unit 50*b* of the driven gear 50. In this state, when the drive gear 46 rotates in the second direction, the power non-transmission state is provided where the power is not transmitted from the drive gear 46 to the driven gear 50.

Specifically, referring to the right side diagrams of steps S9, S11, S13, S15, and S17, when the drive gear 46 rotates in the second direction R2, the four convex units 46*b* also rotate in the second direction R2. As the state is shifted from steps S9 to S11, the convex unit 46*b* facing the second contact unit 62*d* of the rotation restriction unit 62 approaches the second contact unit 62*d* while rotating in the second direction R2, and finally contacts the second contact unit 62*d* in step S11.

When the drive gear 46 is further rotated in the second direction R2, the convex unit 46*b* in contact with the second contact unit 62*d* will rotate in the second direction R2. At this time, the convex unit 46*b* presses the second contact unit 62*d* against the urging force of the torsion spring 60 as illustrated in the right diagrams of steps S13 and S15. As a result, the rotation restriction unit 62 pivots inward in the radial direction of the driven gear 50 about the pivot shaft 62*a* (FIG. 12).

Thereafter, as illustrated in steps S15 to S17, when the drive gear 46 is further rotated in the second direction R2, the convex unit 46*b* which has pressed the second contact unit 62*d* is separated from the second contact unit 62*d*. As a result, the rotation restriction unit 62 pivots outward in the radial direction by the urging force of the torsion spring 60, and pivots to the position where the second contact unit 62*d* contacts the lever rotation restriction unit 50*h* (FIG. 11) of the driven gear 50.

In the present embodiment, when the drive gear 46 is rotated in the second direction R2 with the gear unit 46*a* of the drive gear 46 located within the non-meshing unit 50*b* of the driven gear 50, the gear unit 46*a* continues to rotate idly in the non-meshing unit 50*b* while the convex unit 46*b* intermittently repeats contact with and separation from the second contact unit 62*d* of the rotation restriction unit 62. Therefore, it is possible to prevent inadvertent contact between the tooth of the drive gear 46 and the tooth of the driven gear 50 in the power non-transmission state, and to prevent the generation of a collision noise when the teeth collide.

When the gear unit 46*a* continuously rotates idly in the non-meshing unit 50*b*, the state continues where the meshing state between the gear unit 46*a* of the drive gear 46 and the meshing unit 50*a* of the driven gear 50 is released. As a result, the power non-transmission state where the power of the motor 24 is not transmitted from the drive gear 46 to the driven gear 50 is maintained. Therefore, the possibility that the motor 24 may be out of step can be reduced, and thus, noise caused by the step-out can be suppressed.

The second rotation restriction unit 50*k* will be described with reference to FIG. 26A and FIG. 26B. The upper and lower diagrams of FIG. 26A and FIG. 26B illustrate the relationship between the drive gear 46 and the driven gear 50 in steps S13 to S15. In the upper diagram of FIG. 26A and FIG. 26B, when the convex unit 46*b* contacts the second contact unit 62*d* of the rotation restriction unit 62 to press the second contact unit 62*d*, the convex unit 46*b* rotates in the second direction R2, and thus, the second contact unit 62*d* is pressed to rotate in the counterclockwise direction in FIG. 26A and FIG. 26B.

Here, the second contact unit 62*d* pressed by the convex unit 46*b* will rotate together with the driven gear 50 in the counterclockwise direction in FIG. 26A and FIG. 26B. In the present embodiment, in the driven gear 50, the second rotation restriction unit 50*k* is provided on the first direction R1 side of the non-meshing unit 50*b*. When the driven gear 50 rotates together with the second contact unit 62*d* in the counterclockwise direction in FIG. 26A and FIG. 26B, the driven gear 50 contacts the gear of the gear unit 46*a* of the drive gear 46 located in the non-meshing unit 50*b* (the upper diagram in FIG. 26A and FIG. 26B).

When the second rotation restriction unit 50*k* contacts the tooth of the gear unit 46*a*, the counterclockwise rotation of the driven gear 50 in FIG. 26A and FIG. 26B is restricted. Furthermore, even when the drive gear 46 continues to rotate in the second direction R2 in this state, the state where the second rotation restriction unit 50*k* contacts one of the teeth of the gear unit 46*a* (the lower diagram in FIG. 26A and FIG. 26B) is maintained, and thus, the rotation-restricted state of the driven gear 50 is also maintained. Thus, the gear unit 46*a* of the drive gear 46 can rotate idly in the non-meshing unit 50*b*, and the power non-transmission state can be maintained.

Switching From the Power Non-Transmission State to the Power Transmission State

Then, switching from the power non-transmission state to the power transmission state will be described with reference to FIG. 22 to FIG. 24. In the present embodiment, in a state where the gear unit 46*a* of the drive gear 46 is located within the non-meshing unit 50*b* of the driven gear 50, that is, in the power non-transmission state, when the stator 36 is excited with the first excitation pattern being the initial excitation pattern, the drive magnet 38 moves to a magnetic pole position according to the first excitation pattern of the stator 36. As a result, the drive gear 46 is also located at a position corresponding to the drive magnet 38.

Specifically, in the present embodiment, the convex unit 46*b* is formed according to the magnetic pole of the N pole or the S pole of the drive magnet 38. In the present embodiment, since the drive magnet 38 has eight poles, four convex units 46*b* are formed and disposed at equal intervals in the circumferential direction of the drive gear 46. In the present embodiment, the convex unit 46*b* is provided according to the S pole of the drive magnet 38.

When the stator 36 is excited with the first excitation pattern, the S pole of the drive magnet 38 is located at a position facing the pole tooth 42*a* magnetized to the N pole of the stator 36. As a result, the convex unit 46*b* disposed at the position corresponding to the S pole of the drive magnet 38 is located at a position corresponding to the first contact unit 62*c* of the rotation restriction unit 62 (step S18 in FIG.

22). In this state, the gear unit 46a of the drive gear 46 and the meshing unit 50a of the driven gear 50 are not yet in the state of meshing. It is noted that in the present specification, the position corresponding to the first contact unit 62c of the rotation restriction unit 62 in the convex unit 46b refers to a position where the convex unit 46b contacts the first contact unit 62c to allow switching from the power non-transmission state to the power transmission state in the course of switching the excitation patter from the first excitation pattern to several excitation patterns, as described later.

In this state, when the excitation pattern of the stator 36 is switched from the first excitation pattern to the eighth excitation pattern, the drive gear 46 rotates in the first direction R1, the convex unit 46b located at the position corresponding to the first contact unit 62c of the rotation restriction unit 62 contacts the first contact unit 62c (the right diagram of step S19 in FIG. 22). Furthermore, switching the excitation pattern of the stator 36 from the eighth excitation pattern to the seventh excitation pattern (step S20 in FIG. 22), the sixth excitation pattern (step S21 in FIG. 23), and the fifth excitation pattern (step S22 in FIG. 23) in that order causes the drive gear 46 to rotate in the first direction R1 and thus causes the convex unit 46b in contact with the first contact unit 62c to press the first contact unit 62c in the clockwise direction in FIG. 23.

Here, since the convex unit 46b in contact with the first contact unit 62c presses the first contact unit 62c toward the pivot shaft 62a in the direction intersecting the first contact unit 62c, the rotation restriction unit 62 cannot pivot. As a result, the driven gear 50 is pressed by the convex unit 46b through the first contact unit 62c of the rotation restriction unit 62 and rotates in the clockwise direction in FIG. 23. Thus, the gear unit 46a of the drive gear 46 comes out of the non-meshing unit 50b of the driven gear 50 and meshes with the meshing unit 50a. Thus, the power of the motor 24 is transmitted from the drive gear 46 to the driven gear 50. That is, in the driven gear 50, the power non-transmission state is switched to the power transmission state.

Furthermore, as illustrated in steps S23 and S24, rotating the drive gear 46 in the first direction R1 makes it possible to rotate the driven gear 50 in the clockwise direction in FIG. 23, and thus, the operations for the valve element 56 from steps S1 to S6 can be performed.

Then, the relationship between the drive gear 46 and the driven gear 50 at the origin position (the state of step S18 in FIG. 22) will be described with reference to FIG. 24. In the present embodiment, when the drive gear 46 is located at the origin position, the convex unit 46b is located at a position corresponding to the first contact unit 62c of the rotation restriction unit 62. Here, the lock avoidance tooth 46c is formed at a position corresponding to the convex unit 46b in the circumferential direction of the drive gear 46.

In FIG. 24, a circular arc indicated by a two-dot chain line illustrates an addendum circle of the teeth other than the lock avoidance tooth 46c in the gear unit 46a of the drive gear 46. In FIG. 24, in the state where the drive gear 46 is located at the origin position, a tooth 50j at the boundary between the meshing unit 50a and the non-meshing unit 50b of the driven gear 50 is located at a position where it interferes with an addendum circle of the teeth other than the lock avoidance tooth 46c.

In this state, when the drive gear 46 is to rotate in the first direction in the state where a tooth other than the lock avoidance tooth 46c is disposed at the position of the lock avoidance tooth 46c, a contact of the tooth 50j of the driven gear 50 and the tooth disposed at the position of the lock avoidance tooth 46c and other than the lock avoidance tooth 46c may cause a locked state of the drive gear 46 and the driven gear 50.

In the present embodiment, when the drive gear 46 is located at the origin position, the lock avoidance tooth 46c of the drive gear 46 is disposed close to the tooth 50j of the driven gear 50. Thus, since the addendum circle of the lock avoidance teeth 46c is smaller than the addendum circle of the teeth other than the lock avoidance tooth 46c, a gap 64 can be formed between the tooth 50j of the driven gear 50 and the lock avoidance tooth 46c of the drive gear 46. The formed gap 64 makes it possible to avoid the locked state of the drive gear 46 and the driven gear 50. As a result, in the power transmission switching unit 52, switching from the power non-transmission state to the power transmission state between the drive gear 46 and the driven gear 50 can be smoothly performed, and thus, the occurrence of abnormal operation (displacement of the gear unit 46a of the drive gear 46 with respect to the excitation pattern) and operation failure can be suppressed.

In the present embodiment, the number of magnetic poles of the drive magnet 38 is set to half the number of pole teeth 42a of the core member 42. In addition, since the convex units 46b are formed according to the N pole or the S pole of the drive magnet 38, when the stator 36 is excited with the first excitation pattern, one convex unit 46b of the plurality of convex units 46b is always located at a position corresponding to the first contact unit 62c of the rotation restriction unit 62. Thus, when the excitation pattern is sequentially switched in the first direction from the first excitation pattern, the tooth of the drive gear 46 and the tooth of the driven gear 50 mesh with each other within several patterns, and thus, can be brought into the power transmission state. As a result, the responsiveness of switching of the power transmission state in the power transmission switching unit 52 can be enhanced.

Further, in the present embodiment, the stator 36 is configured by laminating four core members 42. When the number of magnetic poles of the drive magnet 38 is eight, each of the core members 42 has four pole teeth 42a, and accordingly, the number of magnetic poles of the drive magnet 38 is twice the number of pole teeth 42a of the core member 42. As a result, when the predetermined core member 42 is excited, the magnetic pole of the drive magnet 38 located at the position facing the pole tooth 42a (for example, the N pole) at the position corresponding to the power switching is any one of the four magnetic poles (for example, the S pole) which are opposite to the pole of the pole tooth 42a. That is, with respect to the excited core member 42, the drive magnet 38 has any one of the four position patterns (patterns in which the positions of the magnetic poles of the drive magnet 38 in step S9 in FIG. 19 are shifted by 90 degrees to each other). The drive magnet 38 has a magnetic pole opposite to the magnetic pole of the pole tooth 42a of the predetermined core member 42 regardless of any of the four position patterns. Therefore, positioning of the rotor 40 with respect to the stator 36 can be easily performed.

As described above, in the present embodiment, the rotation restriction unit 62 in the power transmission switching unit 52 is configured to allow the driven gear 50 to rotate when the drive gear 46 rotates in the first direction, and to restrict the rotation of the driven gear 50 when the drive gear 46 rotates in the second direction. That is, the rotation restriction unit 62 is configured as a clutch mechanism. By using the configuration of a known clutch mechanism in the rotation restriction unit 62 in the present embodiment, the design time and the costs can be reduced.

The rotation restriction unit 62 in the present embodiment transmits power from the drive gear 46 to the driven gear 50 when the drive gear 46 rotates in the first direction, and cuts off the power transmission from the drive gear 46 to the driven gear 50 when the drive gear 46 rotates in the second direction, thus, the power transmission state can be switched simply by switching the rotation direction of the drive gear 46, and therefore, the configuration of the rotation restriction unit 62 can be simplified.

Modification of the Embodiment (1) In the present embodiment, the configuration is employed where the rotation restriction unit 62 is urged by the torsion spring 60 as an example of the "urging member". However, instead of this configuration, the urging member may be configured by a plate spring or the like.

(2) In the present embodiment, the configuration is employed where the power transmission switching unit 52 switches the power transmission by switching the engagement state (contact with the first contact unit 62c or the second contact unit 62d) between the convex unit 46b and the rotation restriction unit 62. However, instead of this configuration, a configuration may be employed where the rotation restriction unit 62 is provided with a known ratchet mechanism to cause the drive gear 46 to rotate idly.

(3) In the present embodiment, the configuration is employed where the drive magnet 38 has eight magnetic poles, and the convex units 46b are provided at four positions corresponding to either the N pole or the S pole. However, a configuration may be employed where when the drive magnet 38 has four poles, two convex units 46b are provided; when the drive magnet 38 has six poles, three convex units 46b are provided; and when the drive magnet 38 has ten poles, five convex units 46b are provided.

(4) In the present embodiment, the configuration is employed where the second rotation restriction unit 50k is provided on the other side of the convex-shaped unit 50n in the circumferential direction of the driven gear 50. However, instead of this configuration, as illustrated in FIG. 28, a configuration may be employed where at a position corresponding to a non-meshing unit 66a of a driven gear 66, a second rotation restriction unit 66c may be provided at the tip of a protruding unit 66b protruding in the radial direction of the driven gear 66. In the present embodiment, the second rotation restriction unit 66c is configured to be engageable with the main body 46d of the drive gear 46, and as an example, is configured as a curved surface abuttable on the outer periphery of the main body 46d. When the driven gear 66 is about to co-rotate with the drive gear 46, the second rotation restriction unit 66c contacts the main body 46d of the drive gear 46, restricts the rotation of the driven gear 66, and suppresses the driven gear 66 from co-rotating.

It is noted that at least an embodiment of the present invention is not limited to the above embodiment, and various modifications are possible within the scope of the invention described in the claims, and such modifications are also included in the scope of at least an embodiment of the present invention.

What is claimed is:

1. A valve drive device comprising:
    a base including a fluid inlet, a fluid outlet, and a valve seat surface, at least one of the fluid inlet and the fluid outlet being opened at the valve seat surface;
    a cover configured to define a valve chamber such that the fluid inlet and the fluid outlet communicate with each other between the valve seat surface and the cover;
    a valve element configured to open and close any one of the fluid inlet and the fluid outlet in the valve chamber and comprising a contact surface sliding on the valve seat surface; and
    a valve element driver configured to drive and rotate the valve element,
    wherein the valve element driver comprises:
        a motor;
        a drive gear configured to rotate together with a rotor of the motor;
        a driven gear configured to rotate, in a state of meshing with the drive gear, the valve element by rotating the drive gear; and
        a power transmission switching unit capable of switching between a power transmission state where the drive gear meshes with the driven gear to transmit power of the motor to the driven gear and a power non-transmission state where a meshing state between the drive gear and the driven gear is released.

2. The valve drive device according to claim 1, wherein the driven gear comprises a meshing unit in which teeth are formed along a circumferential direction of the driven gear, and a non-meshing unit in which the teeth are not formed in the circumferential direction.

3. The valve drive device according to claim 2, wherein the meshing unit is formed continuously along the circumferential direction, and
    wherein meshing between the drive gear and the driven gear is released when switching from the power transmission state to the power non-transmission state is performed.

4. The valve drive device according to claim 2, wherein the power transmission switching unit comprises:
    one or more convex units formed on the drive gear and protruding toward a radial direction of the drive gear; and
    a rotation restriction unit provided on the non-meshing unit of the driven gear and configured to engage with the one or more convex units, and
    wherein when the rotation restriction unit engages with the one or more convex units of the drive gear rotated in a first direction in the power non-transmission state, the rotation restriction unit meshes the drive gear and the driven gear to switch from the power non-transmission state to the power transmission state, and when the drive gear rotates in a second direction opposite to the first direction, the rotation restriction unit maintains the power non-transmission state without meshing the drive gear and the driven gear.

5. The valve drive device according to claim 4, wherein the rotation restriction unit is configured as a clutch mechanism configured to allow rotation of the driven gear when the drive gear rotates in the first direction and to restrict rotation of the driven gear when the drive gear rotates in the second direction.

6. The valve drive device according to claim 4, wherein the rotation restriction unit is a lever member that is pivotably attached to the driven gear with respect to the driven gear and urged outward in a radial direction of the driven gear, and comprises a first contact unit configured to contact the one or more convex units when the drive gear rotates in the first direction and a second contact unit configured to contact the one or more convex units when the drive gear rotates in the second direction,
- wherein when a convex unit among the one or more convex units contacts the first contact unit, the rotation restriction unit is pressed by the convex unit to rotate the driven gear, teeth of the drive gear and teeth of the driven gear mesh with each other, and the power transmission state is obtained, and
- wherein when a convex unit among the one or more convex units contacts the second contact unit, the rotation restriction unit pivots inward in the radial direction against an urging force urging the rotation restriction unit, the drive gear rotates idly without the teeth of the drive gear meshing with the teeth of the driven gear, and the power non-transmission state is maintained.

7. The valve drive device according to claim 6, wherein the driven gear comprises a co-rotation prevention unit configured to restrict the second contact unit from being pressed by the convex unit in a rotation direction of the one or more convex units and the driven gear from rotating in a rotation direction in accordance with a rotation direction of the drive gear, when the convex unit contacts the second contact unit and the rotation restriction unit pivots inward in the radial direction against the urging force urging the rotation restriction unit.

8. The valve drive device according to claim 6, further comprising: an urging member configured to urge the rotation restriction unit outward in the radial direction of the driven gear.

9. The valve drive device according to claim 8, wherein the urging member is a torsion spring held on a shaft of the driven gear,
- wherein a holding unit configured to hold one end of the torsion spring is provided on the driven gear, and
- wherein the other end of the torsion spring is configured to urge the rotation restriction unit.

10. The valve drive device according to claim 4, wherein a lock avoidance tooth is provided in the drive gear at a position corresponding to the one or more convex units in the circumferential direction, and an addendum circle diameter of the lock avoidance tooth is smaller than an addendum circle diameter of a tooth other than the lock avoidance tooth.

11. The valve drive device according to claim 10, wherein the one or more convex units are formed at four places on the drive gear at equal intervals in the circumferential direction, and
- when the drive gear and the driven gear are in the power non-transmission state and the motor is rotated in the first direction to set the drive gear to an origin position, the lock avoidance tooth is located at a position facing a tooth closest to the non-meshing unit in the driven gear.

12. The valve drive device according to claim 1, wherein the number of teeth formed on the drive gear is smaller than the number of teeth formed on the driven gear.

* * * * *